United States Patent
Strohmann et al.

(10) Patent No.: US 12,494,081 B1
(45) Date of Patent: Dec. 9, 2025

(54) ACOUSTIC SENSORS WITH REFRACTIVE MICROLENS

(71) Applicant: QUALCOMM Incorporated, San Diego, CA (US)

(72) Inventors: Jessica Liu Strohmann, Cupertino, CA (US); Yipeng Lu, Moraga, CA (US); Hung-Jen Wang, New Taipei (TW); Shaojui Li, Hsinchu (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/814,196

(22) Filed: Aug. 23, 2024

(51) Int. Cl.
*H10K 59/40* (2023.01)
*G01S 7/52* (2006.01)
*G06V 40/13* (2022.01)

(52) U.S. Cl.
CPC ...... *G06V 40/1306* (2022.01); *G01S 7/52079* (2013.01)

(58) Field of Classification Search
CPC .. G06V 30/1306; G01S 7/52079; H05B 33/28
USPC .......................................................... 257/40
See application file for complete search history.

(56) References Cited

U.S. PATENT DOCUMENTS

2023/0157123 A1* 5/2023 Kubota ............... H05B 33/28
257/40

* cited by examiner

*Primary Examiner* — Abdul-Samad A Adediran
(74) *Attorney, Agent, or Firm* — QUALCOMM Incorporated

(57) ABSTRACT

Acoustic sensors with one or more microlens structures, as well as methods for fabricating and operating such acoustic sensor systems are disclosed. In some embodiments, an apparatus may include: an acoustic sensing element; a display stack; a first layer of material having a first acoustic refractive index and one or more microlens structures disposed at a first surface of the first layer of material; and a second layer of material disposed on the first layer of material and the one or more microlens structures, the second layer of material having a second acoustic refractive index that is different from the first acoustic refractive index. The one or more microlens structures may be configured to form a focused pressure wave from one or more acoustic signals emitted by the acoustic sensing element.

17 Claims, 20 Drawing Sheets

ACOUSTIC SENSORS WITH REFRACTIVE MICROLENS

TECHNICAL FIELD

This disclosure relates generally to devices and systems using acoustic sensors.

DESCRIPTION OF RELATED TECHNOLOGY

A variety of different sensing technologies and algorithms are being implemented in devices. Sensing technology is ubiquitous in devices and can be used in various ways, such as identity and fingerprint detection, and biometric and biomedical applications, including health and wellness monitoring. Some such sensing technologies are, or include, acoustic sensors including ultrasonic sensors. This push is partly a result of performance limitations in traditional sensing used with devices, including in emerging technologies such as foldable displays. Although some previously deployed devices can provide acceptable results, improved detection devices and systems would be desirable.

SUMMARY

The systems, methods and devices of this disclosure each have several aspects, no single one of which is solely responsible for the desirable attributes disclosed herein.

In one aspect of the present disclosure, an apparatus is disclosed. In some embodiments, the apparatus may include: an acoustic sensing element; a display stack; a first layer of material having a first acoustic refractive index and one or more microlens structures disposed at a first surface of the first layer of material; and a second layer of material disposed on the first layer of material and the one or more microlens structures, the second layer of material having a second acoustic refractive index that is different from the first acoustic refractive index.

In some implementations thereof, the first layer of material and the second layer of material may be disposed between the acoustic sensing element and the display stack such that the first layer of material is disposed adjacent to the acoustic sensing element, the second layer of material may be disposed adjacent to the display stack, and the one or more microlens structures may be configured to form a focused pressure wave from one or more acoustic signals emitted by the acoustic sensing element.

In some implementations thereof, the one or more microlens structures may include one or more convex microlens structures that protrude into the second layer of material. In some variants thereof, the first acoustic refractive index of the first layer of material may be higher than the second acoustic refractive index of the second layer of material.

In some implementations thereof, the one or more microlens structures may include one or more concave microlens structures into which the second layer of material protrudes. In some variants thereof, the first acoustic refractive index of the first layer of material may be lower than the second acoustic refractive index of the second layer of material.

In some implementations thereof, the first acoustic refractive index of the first layer of material may be lower than the second acoustic refractive index of the second layer of material. In some implementations thereof, the first acoustic refractive index of the first layer of material may be higher than the second acoustic refractive index of the second layer of material.

In some embodiments, the apparatus may include: a first layer of material having a first acoustic refractive index and one or more microlens structures at a surface of the first layer of material; and a second layer of material abutting the first layer of material and the one or more microlens structures, the second layer of material having a second acoustic refractive index that is different from the first acoustic refractive index.

In some implementations thereof, the first acoustic refractive index may be higher than the second acoustic refractive index; and the one or more microlens structures at the surface of the first layer of material may include convex structures that protrude into the second layer of material.

In some implementations thereof, the first acoustic refractive index may be lower than the second acoustic refractive index; and the one or more microlens structures at the surface of the first layer of material may include concave structures into which the second layer of material protrudes.

In some embodiments, the apparatus may include: an acoustic transmitter element configured to cause emission of acoustic signals; a first layer of material and one or more microlens structures having a first acoustic refractive index; and a second layer of material having a second acoustic refractive index that is different from the first acoustic refractive index.

In some implementations thereof, the first layer of material and the second layer of material may be configured to cause the emitted acoustic signals to propagate through the one or more microlens structures and thereby constructively form, at a location different from a location of the acoustic transmitter element, one or more acoustic signals having a higher pressure than the emitted acoustic signals.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
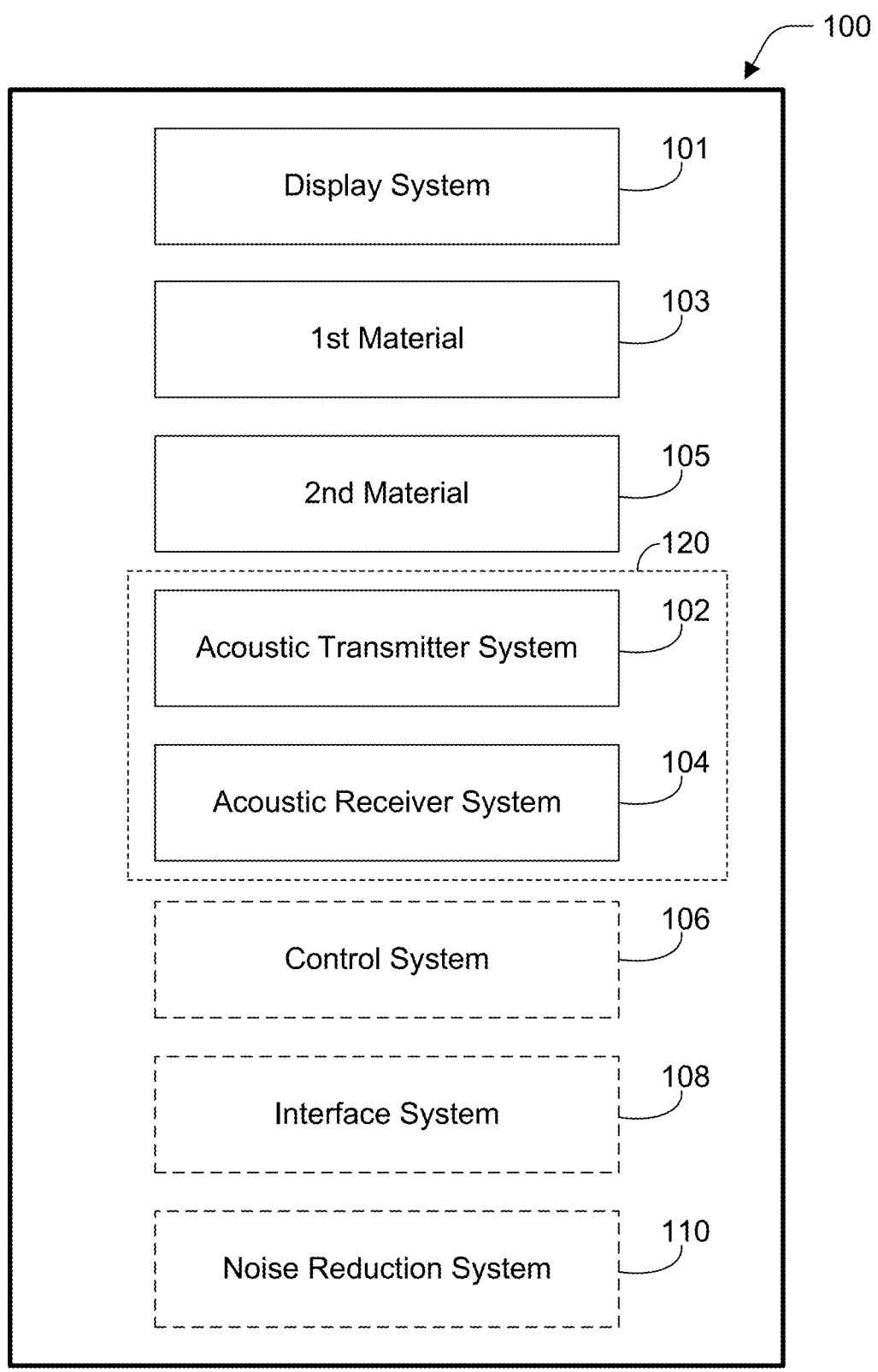
FIG. 1 shows a block diagram that shows example components of an apparatus according to some embodiments described herein.

The following description is directed to certain implementations for the purposes of describing various aspects of this disclosure. However, a person having ordinary skill in the art will readily recognize that the teachings herein can be applied in a multitude of different ways. Some of the concepts and examples provided in this disclosure are especially applicable to user sensing applications. For example, fingerprint detection can be performed using the disclosed embodiments. However, some implementations also may be applicable to other types of sensing applications including biometric sensing, as well as to various other systems. The described implementations may be implemented in any device, apparatus, or system that includes an apparatus as disclosed herein. In addition, it is contemplated that the described implementations may be included in or associated with a variety of electronic devices (which may also be referred to herein simply as "devices" or a "device") such as, but not limited to, mobile telephones, multimedia Internet-enabled cellular telephones, mobile television receivers, wireless devices, smartphones, smart cards, tablets, wearable devices such as bracelets, armbands, wristbands, watches, smartwatches, rings, headbands, patches, chest bands, anklets, etc., Bluetooth® devices, personal data assistants (PDAs), wireless electronic mail receivers, handheld or portable computers, netbooks, notebooks, smartbooks, printers, copiers, scanners, facsimile devices, global positioning system (GPS) receivers or navigators, cameras, digital media players, game consoles, wrist watches, clocks, calculators, television monitors, flat panel displays, electronic reading devices (e.g., e-readers), mobile health devices, computer monitors, auto displays (including odometer and speedometer displays, dashboard displays, etc.), cockpit controls and/or displays, camera view displays (such as the display of a rear view camera in a vehicle), architectural structures, microwaves, refrigerators, stereo systems, cassette recorders or players, DVD players, CD players, VCRs, radios, portable memory chips, washers, dryers, washer/dryers, parking meters, automobile doors, Internet of Things (IoT) devices, palm scanners, or point-of-sale (POS) terminals. Thus, the teachings are not intended to be limited to the specific implementations depicted and described with reference to the drawings; rather, the teachings have wide applicability as will be readily apparent to persons having ordinary skill in the art.

Modern devices include various functionalities and hardware that support the functionalities. As but one example, fingerprint sensing using a sensor is one such function of a device. In some embodiments, acoustic imaging, e.g., via transmission and receipt of ultrasonic signals by an acoustic transmitter element and an acoustic receiver element of the fingerprint sensor, may be used to obtain the fingerprint data.

As an aside, toe prints can be used to identify users because they are unique and permanent, similar to fingerprints. Toe prints have ridge (raised portions) patterns and furrows (recessed portions, otherwise known as valleys) similar to fingerprints. Similar to fingerprints, toe prints have unique features referred to as minutiae points that can differentiate one person from another. The whorls, ridges, valleys, and furrows in toe prints develop uniquely in each person. Therefore, the embodiments described herein can be used with toes for equal effectiveness as with fingers. Palms and feet may also be used for identification using unique features. However, toes, palms and feet are used less often for identification, particularly with aforementioned types of devices. For simplicity, "fingerprint" in the context of the present disclosure may refer to fingerprints, toe prints, palm prints, or footprints, and "finger" may refer to fingers, toes, palms, or feet.

Fingerprint sensing can be used by software and applications (apps) usable with a device to biometrically authenticate a user. Fingerprint data obtained using a fingerprint sensor may be used by the device to identify an object (such as a finger or fingerprint), change an operative state of the device, and/or perform other operations with the device (unlock or lock the device, initialize an application, authenticate a user, etc.). Some devices may be configured such that the sensor (such as a fingerprint sensor) is disposed beneath a display or other surface, which in cases of some devices (smartphone, tablets, etc.) may be a screen or other user interface.

Fingerprint sensors are thus useful for various purposes and are usable with various types of devices and/or displays. However, there are performance limitations when it comes to certain devices. As one example, flexible or foldable devices, when using typical sensors do not have the level of sensing performance that can be seen with, e.g., flat-panel displays. As a more specific example, ultrasonic signals transmitted or received by conventional sensors in conventional foldable displays or display stacks may have a transmission rate or a signal strength that is as little as 25-35% of that of an OLED (organic light-emitting diode) panel or a plastic OLED (POLED). As acoustic sensing often uses plane-wave propagation, weak signals are a challenge especially in fingerprint sensing with flexible (e.g., foldable) devices. As consumer devices and display technologies continue to mature, and flexible displays become more applicable in existing and emerging technologies, improving the performance of sensors in such flexible devices (which may include or utilize curved surfaces or displays or screens) can improve user experience and allow the sensors to be used with many types of devices and other objects.

In some embodiments described in the present disclosure, an acoustic (e.g., ultrasonic) sensor apparatus or system may include a stack of layers of materials composed of media that allow propagation of acoustic signals. At least one layer of material may include structures that improve the signal strength of acoustically transmitted signals. For example, in some implementations, microlens structures having a convex shape may be disposed at a first layer of material. In some configurations, microlens structures having a concave shape may be disposed at the first layer of material. In some configurations, the first layer of material having the microlens structures may have an acoustic refractive index (RI) that is lower than a second layer of material disposed adjacently to the first layer of material. Such first layer of material may include concave microlens structures. In some configurations, the first layer of material having the microlens structures may have an acoustic refractive index that is higher than the adjacent second layer of material. Such first layer of material may include convex microlens structures. According to embodiments of the present disclosure, combinations of (i) acoustic refractive indices of the first and second layers of material and (ii) the convex or concave shape of the microlens structures between the first and second layers of material may result in a focused pressure wave having a larger acoustic signal. Various approaches to fabricating the convex and concave microlens structures are also disclosed herein.

Particular implementations of the subject matter described in this disclosure can be implemented to realize one or more of the following potential advantages. The configurations disclosed herein may use acoustic beamforming to form stronger transmitting signals having larger acoustic signals, thereby overcoming the aforementioned challenge of weak signals, including in flexible devices (e.g., foldable displays). The configurations disclosed herein can improve signal strength and resolution, and reduce crosstalk. The embodiments discussed herein may therefore advantageously be used for various useful applications involving acoustic sensing (e.g., fingerprint sensing), including with flexible sensor stacks that may be used with flexible devices and/or curved surfaces or screens.

Additional details will follow after an initial description of relevant systems and technologies.

FIG. 1 is a block diagram that shows example components of an apparatus 100 according to some implementations. In some examples, the apparatus 100 may include a display system 101, an acoustic transmitter system 102, a first layer of material 103, and a second layer of material 105.

In some configurations, apparatus 100 may be a sensor apparatus usable with an electronic device such as that listed elsewhere above. In some configurations, apparatus 100 may be part of the device or another apparatus.

In some embodiments, the display system 101 may be or include a touchscreen or a platen 390. Some examples may include an OLED panel or another flat-panel display, or a flexible display, or a layer of a stack of materials of the display.

Some implementations of the apparatus 100 may include an acoustic receiver system 104, such as ultrasonic sensor array 300, sensor system 202, or ultrasonic sensor array 212. Some implementations of the apparatus 100 may include a control system 106, an interface system 108, a noise reduction system 110, or a combination thereof.

Various configurations of acoustic transmitter system 102, the first layer of material 103, and the second layer of material 105 are disclosed herein. Configurations of acoustic receiver system 104 are also disclosed herein. Specific examples are described in more detail below.

Figure 3A:
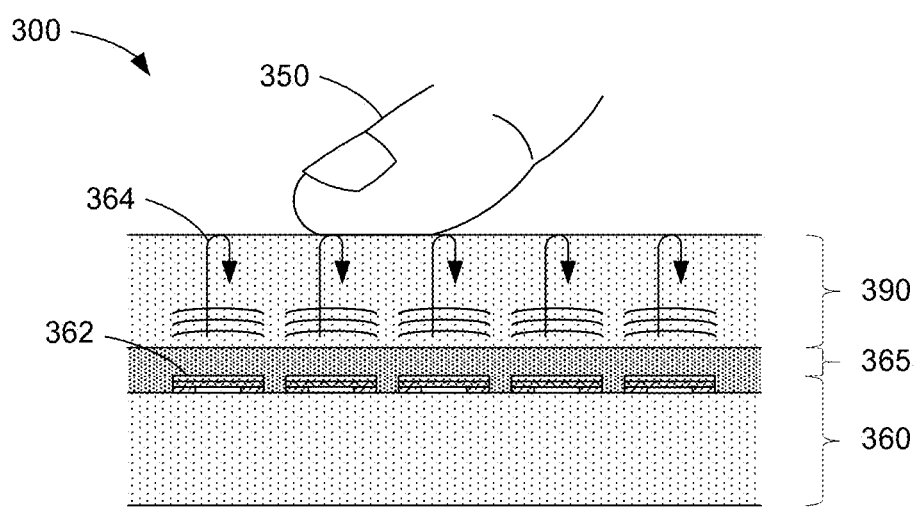
FIG. 3A shows a side view of an example configuration of an ultrasonic sensor array capable of ultrasonic imaging.

In some embodiments, the acoustic transmitter system 102 may be configured to generate and emit acoustic signals, e.g., toward a target object, such as a finger or other object. Acoustic signals may include one or more acoustic waves, such as ultrasonic waves 364 as shown in FIG. 3A. In some implementations, the acoustic transmitter system 102 may include one or more ultrasonic transmitters or transmitter elements configured to generate, emit, and/or direct ultrasonic waves. The one or more ultrasonic transmitters may be one or more ultrasonic transducers. In some implementations, ultrasonic waves may be generated in a selected portion of multiple ultrasound transmitter elements (e.g., in an array). In some configurations, the one or more ultrasonic transmitter elements may be arranged in an array of ultrasonic transducer elements, such as an array of PMUTs and/or an array of CMUTs. In some examples, the ultrasonic transmitter(s) may include an ultrasonic plane-wave generator.

In some implementations, a control system 106 may include one or more controllers or processors, or a drive circuit or various types of drive circuitry, configured to control the one or more ultrasonic transmitter elements via one or more instructions to the acoustic transmitter system 102. For example, ultrasonic waves may be generated in pulses (e.g., at least partly repeating or other patterns) or according to other timing instructions. Although "ultrasound" may typically apply to acoustic energy with a frequency above human hearing, or 20 kilohertz (kHz), ultrasound frequencies used for fingerprint imaging may exceed well over this lower limit. In some implementations, the control system 106 may cause ultrasonic waves from the acoustic transmitter system 102 to be generated and emitted at a frequency that is between about 12 megahertz (MHz) to 50 MHz, which may result in sufficient resolution for fingerprint imaging, e.g., up to 1000 dots per inch (dpi). Other suitable frequencies may be used for the acoustic waves in other implementations.

Control system 106 may be electrically and/or communicatively coupled to the apparatus 100. In some configurations, the control system 106 may be part of the apparatus 100. In some configurations, the control system 106 may be part of a device having the apparatus 100. In some configurations, the control system 106 may be external to the apparatus 100 or the device having the apparatus 100, for example but not limited to, on a server (cloud), remote storage, or another device other than the device having the apparatus 100. In some configurations, the one or more controllers or processors of the control system 106 may be distributed across two or more devices including external apparatus.

In some implementations, the control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. In some implementations, functionality of the control system 106 may be partitioned between one or more controllers or processors, such as a dedicated sensor controller and an applications processor of a mobile device.

If the apparatus 100 includes an ultrasonic transmitter, such as in the acoustic transmitter system 102, the control system 106 may be configured for controlling the ultrasonic transmitter. In some embodiments, a control system 106 may cause the acoustic transmitter system 102 to generate and emit acoustic waves. In some implementations, the control system 106 may cause the acoustic transmitter system 102 to generate and emit acoustic waves in response to a detection of an object (e.g., a finger). In some cases, the object may be detected based at least on a force applied to the apparatus 100. Sensor elements 304 may be used for non-ultrasonic force detection, for example. In another example, a resistive sensor or touchscreen may allow detection of sufficient force applied to the apparatus 100.

In some cases, the object may be detected based at least on light occlusion. In such cases, a light sensor may also be included with the apparatus 100 so that an amount of light or its absence (e.g., relative to a threshold) can be determined, e.g., by control system 106, at or near the apparatus 100.

In some cases, the object may be detected based at least on a capacitive shift or response. For example, a capacitive sensor or touchscreen may allow determination of a capacitive response based on the natural conductivity of the object such as a finger that is making contact with the display system 101 of the apparatus 100.

In some implementations, a combination of one or more detection methods described above may be used to detect the object. For instance, detection of the object may require, in some configurations, sufficient force and sufficient capacitive response. In another example, detection of the object may require sufficient force, sufficient capacitive response, and sufficient absence of light.

In some configurations, a delay may be placed between the detection of the object and the emission of the acoustic waves, where the length of the delay may be 100 milliseconds, 500 milliseconds, etc. Not causing emission of acoustic waves immediately may allow time for the object to stabilize against the apparatus 100 before performing, e.g., fingerprint sensing. Force or occlusion may occur even if the finger is not pressed onto the apparatus 100 completely.

In some implementations, the acoustic transmitter system 102 may include one or more acoustic waveguides or ultrasonic waveguides (or other sound-directing elements) constructed to propagate and direct acoustic or ultrasonic waves toward a target location that does not have direct line of sight from at least a portion of the one or more ultrasound transmitter elements. Such waveguides may be useful in certain devices, e.g., foldable displays, or chasses that may optimize the locations of the acoustic transmitter system 102 and the location of a fingerprint sensor by placing them out of direct line of sight.

Thin-film transistors (TFTs) may be grown and incorporated on a semiconductor material or substrate. In some implementations, the substrate may include a silicon (Si)-based substrate, which may be referred to herein as a "Si-TFT substrate" or simply a "substrate." In some cases, the Si-TFT substrate may be made up of amorphous silicon (a-Si), which is a non-crystalline form of silicon. In some cases, polycrystalline silicon (poly-Si) may be used, which can offer higher electron mobility than a-Si, which allows for higher refresh rates such as the 240 Hz needed for certain types of displays (e.g., HDTV (high-definition television)) and high-performance applications (e.g., OLED such as AMOLED (active-matrix OLED)). In some other cases, other forms of silicon films may be implemented, such as high-temperature polysilicon (HTPS) or continuous granular crystalline silicon (CG silicon). In some other cases, non-silicon-based TFT films may be used, such as metal oxide (MO) or indium gallium zinc oxide (IGZO).

In some cases, the substrate may be glass or a polymer (such as a plastic material, e.g., polyimide, especially for flexible displays). TFTs may be grown on such glass or polymer substrates as well.

In some embodiments, the first layer of material 103 and the second layer of material 105 may each be a separate layer from the substrate. In some embodiments, the first layer of material 103 may be part of the substrate. In some cases, the entire substrate may be composed of the first layer of material 103. In some implementations, the substrate (e.g., Si-TFT substrate) may include TFTs that may enable usage and control of one or more individual portions (pixels) of the acoustic transmitter system 102 and/or the acoustic receiver system 104. For instance, one or more acoustic transmitter elements and/or one or more acoustic receiver elements may include pixelated electrodes having associated TFT circuitry. More specifically, one or more receiver elements (pixels) may receive electric signals from a piezoelectric material adjacent to the substrate, where the piezoelectric material may be developed to convert mechanical energy from received acoustic signals (e.g., ultrasonic waves) to the electric signals. One or more transmitter elements (pixels) may cause emission of acoustic signals (e.g., ultrasonic waves) from the piezoelectric material as a result of application of voltage to the piezoelectric material.

The types of material that may be used in the first layer of material 103 and the second layer of material 105 may depend on the acoustic refractive index (RI) of the material. Acoustic RI may be considered to be high or low (e.g., depending on the value of the acoustic RI being above or below a threshold). A few examples of materials considered to have a low (or relatively lower) acoustic RI (indicating a high speed of sound through the material) may include diamond, glass, fused silica, titanium dioxide, silicon carbide, and high-index polymers. High-index polymers may refer herein to polymers having a high optical refractive index (e.g., over 1.50), such as high-refractive-index polymer (HRIP). A few examples of materials considered to have a high (or relatively higher) acoustic RI (indicating a low speed of sound through the material) may include acrylate, propionate, acetate, aerogel, and siloxane.

The following table lists additional examples of materials or media, their acoustic RI values, example speeds of acoustic signals transmitted through these media, and their optical RI values.

TABLE 1

Example substrate materials and their optical RI values and acoustic RI values.

| Material | Acoustic RI | Speed of Sound (m/s) | Optical RI |
|---|---|---|---|
| Aerogel | 0.86-3.43 | 100-400 | 1.0-1.3 |
| Water | 0.23 | 1500 | 1.33 |

TABLE 1-continued

Example substrate materials and their
optical RI values and acoustic RI values.

| Material | Acoustic RI | Speed of Sound (m/s) | Optical RI |
|---|---|---|---|
| Propionate | 0.23-0.27 | 1500-2000 | 1.4-1.6 |
| Acetate | 0.23-0.27 | 1500-2000 | 1.4-1.6 |
| Acrylate | 0.14-0.34 | 1000-2500 | 1.4-1.6 |
| Siloxane | 0.14-0.17 | 1000-2000 | 1.4-1.6 |
| Fused silica (lens) | 0.06 | 5900 | 1.45 |
| Glass | 0.056-0.061 | 5600-6040 | 1.5-1.6 |
| Stainless steel | 0.059 | 5790 | 2.75 |
| High-index polymers | 0.011-0.023 | 1500-3000 | 1.5-1.7 |
| Diamond | 0.03 | 12000 | 2.41 |
| Titanium dioxide | 0.057-0.085 | 4000-6000 | 2.5 |
| Silicon carbide | 0.026-0.038 | 9000-13000 | 2.6-2.7 |

Note that there is a difference between optical RI and acoustic RI. Optical RI generally can be determined by determining the ratio of speed of a propagating electromagnetic wave in a first medium to that in a second medium. Optical RI is a dimensionless number that describes how the speed of light changes as it travels through a given medium.

In the context of the present disclosure, acoustic RI is a dimensionless number that is indicative of how much the speed of sound changes as it passes through a medium (such as those listed above in Table 1), relative to a reference medium. To determine an acoustic RI value, a reference medium other than vacuum (e.g., water, air) may be chosen. The example acoustic RI values listed in Table 1 are relative to air as a reference medium, meaning the acoustic RI may refer to a ratio of speed of sound in air (approximately 343 m/s) to speed of sound in a given material. Hence, in the context of the present disclosure, there is an inverse correlation between acoustic RI and the speed of sound through a medium. That is, the speed of sound is faster in a medium having a lower acoustic RI than in a medium having a higher acoustic RI. As an illustrative example, sound would travel faster through glass (at 5600-6040 m/s) than in another material such as acrylate (at 1000-2500 m/s). Glass therefore has a lower acoustic RI than acrylate, and acrylate has a higher acoustic RI than glass. In some scenarios, acoustic RI (and the speed of sound as it passes through a medium) may vary according to properties of or conditions applied to the medium, such as temperature, pressure, or density of the material.

As alluded to above, there is not necessarily a correlation between optical RI and acoustic RI. In various embodiments of the present disclosure, materials chosen for use in the first layer of material 103 and the second layer of material 105 may depend on the acoustic RI with no concern for optical RI, as apparatus 100 may be configured to emit and receive acoustic signals (e.g., ultrasonic waves), e.g., for enhanced acoustic imaging applications such as fingerprint sensing and/or collection of fingerprint data. Some materials having relatively lower optical RI may have relatively higher acoustic RI and vice versa. Take glass as an example. As indicated above in Table 1, glass may have a relatively high optical RI of 1.5-1.6 while having a relatively low acoustic RI of 0.056-0.061 (which may depend on, e.g., type of glass).

In some approaches, materials may be engineered or constructed or otherwise modified to have a desired acoustic RI. For example, lower acoustic RI (increasing the speed of sound through the material by, e.g., 1.5 or 2 times) may be achieved with a material in some cases by doping the material by adding a material different from the base material. For instance, particles (including, e.g., nanoparticles) such as carbon nanotubes may be added to a material to decrease the acoustic RI of the material.

In some embodiments, the first layer of material 103 may include one or more microlens structures formed on a surface of the first layer of material 103. A microlens may refer to a curved, spherical, or semispherical structure having a small diameter, up to 1 millimeter (mm) or as small as a few (e.g., 5) microns (μm). Microlens structures may possess characteristics that are different from, for example, an optical lens. For example, microlens structures may be constructed of various types of materials (such as some or all of those listed in Table 1) and do not need to be transparent like an optical lens. In some implementations, the one or more microlens structures may include a plurality of microlens structures arranged in an array of microlens structures each having defined parameter(s) such as width, radius, depth, and/or height, and/or distance(s) to adjacent microlens structures.

In some implementations, the one or more microlens structures may be part of the substrate (e.g., Si-TFT substrate). That is, the substrate may include or be the first layer of material 103 with no other substrate. In some implementations, the one or more microlens structures may be in a separate additional layer between the substrate (e.g., Si-TFT substrate) and a display (e.g., in the display system 101). That is, the first layer of material 103 may be a substrate that is distinct from another substrate.

In some implementations, the one or more microlens structures may be in a concave shape such that the microlens structures protrude into the first layer of material 103. The second layer of material 105 disposed adjacent to the first layer of material 103 may protrude into the space created by the concave microlens structures. In some implementations, concave microlens structures may have a pitch (distance at which microlens structures are spaced apart) of about 50-300 μm.

In some implementations, the one or more microlens structures may be in a convex shape such that the one or more microlens structures protrude out of the first layer of material 103, e.g., into the second layer of material 105 disposed adjacent to the first layer of material 103. In some cases, the microlenses may be composed of the same material as the first layer of material 103. In some cases, the microlenses may be composed of a different material as the first layer of material 103. In some implementations, convex microlens structures may have a pitch of about 50-300 μm.

In some configurations, the first layer of material 103 may include a material having a low acoustic RI (higher speed of sound), e.g., glass, fused silica, titanium dioxide, silicon carbide, or a high-index polymer. Another material having a low acoustic RI may be selected (e.g., from Table 1 or elsewhere as long as it meets at least the following criterion) and used in the first layer of material 103, where low acoustic RI may be an acoustic RI that is below an acoustic RI threshold, such as 1.50, 1.25, 1.00, 0.50, 0.25, or 0.10 (or another determined threshold). In some such configurations, the first layer of material 103 may have one or more microlens structures that are concave, and the second layer of material 105 may include a material having a high acoustic RI (lower speed of sound), e.g., acrylate, propionate, acetate, aerogel, or siloxane. Another material having a high acoustic RI may be selected (e.g., from Table 1 or elsewhere as long as it meets at least the following criterion) and used in the second layer of material 105, where high acoustic RI may be an acoustic RI meeting or exceeding an acoustic RI threshold, such as at least 1.50, at least 2.00, at least 3.00, at least 3.50, or at least 4.00 (or another threshold). An example is shown and will be described further with respect to FIG. 4.

In some configurations, the first layer of material 103 may include a material having a high acoustic RI (lower speed of sound), e.g., acrylate, propionate, acetate, aerogel, or siloxane. Another material having a low acoustic RI may be used in the first layer of material 103, where high acoustic RI may be an acoustic RI meeting or exceeding an acoustic RI threshold, such as at least 1.50, at least 2.00, at least 3.00, at least 3.50, or at least 4.00 (or another threshold). In such configurations, the first layer of material 103 may have one or more microlens structures that are convex, and the second layer of material 105 may include a material having a low acoustic RI (higher speed of sound), e.g., glass, fused silica, titanium dioxide, silicon carbide, or a high-index polymer. Another material having a high acoustic RI may be used in the second layer of material 105, where low acoustic RI may be an acoustic RI that is below an acoustic RI threshold, such as 1.50, 1.25, 1.00, 0.50, 0.25, or 0.10 (or another threshold). An example is shown and will be described further with respect to FIG. 6.

In embodiments of the present disclosure, the difference between the acoustic RI of the first layer of material 103 and the acoustic RI of the second layer of material 105 may be a salient factor in the configurations described above. In some cases, the larger the difference, the greater the improvement may be in acoustic signaling performance, e.g., by the acoustic transmitter system 102. In some cases, however, there may be a limit so as to avoid potential total internal reflection of acoustic waves. As such, the first layer of material 103 and the second layer of material 105 may be selected to avoid total internal reflection. In some examples, the delta or difference in the acoustic RI may be 3.00 or less, 0.30 or less, 0.03 or less, or another suitable difference that creates a focused pressure wave. In some cases, materials may be selected for use with the first layer of material 103 and the second layer of material 105 respectively based on such difference in acoustic RI values meeting or exceeding a difference threshold, which may be at least 2.00, 2.50, 3.00, or more.

In the presently disclosed configurations, what may be relevant to the selection of materials for the first layer of material 103 and the second layer of material 105 are relative values of acoustic RI. In some cases, the first layer of material 103 may be selected from a material listed in Table 1 (or others having a desirable acoustic RI as discussed below). Similarly, the second layer of material 105 may be selected from a material listed in Table 1 (or others having a desirable acoustic RI as discussed below).

The acoustic signals (e.g., ultrasonic waves) emitted from acoustic transmitter system 102 may cause or result in reflection of acoustic wave emissions at least in part from the object (e.g., finger). As noted above, characteristics of the reflected waves such as amplitudes may depend in part on the acoustic properties of the object and/or the platen. These reflected acoustic waves (e.g., ultrasonic waves) may be detectable by the acoustic receiver system 104.

Various examples of an acoustic receiver system 104 are disclosed herein, some of which may include an ultrasonic receiver system. In some implementations, the acoustic receiver system 104 may include an ultrasonic receiver system having the one or more ultrasonic receiver elements. In some implementations, one or more ultrasonic receiver element and one or more ultrasonic transmitter elements may be combined in an ultrasonic transceiver. In some examples, the acoustic receiver system 104 may include a piezoelectric receiver layer, such as a layer of PVDF polymer or a layer of PVDF-TrFE copolymer. In some implementations, a single piezoelectric layer may serve as an ultrasonic receiver. In some implementations, other piezoelectric materials may be used in the piezoelectric layer, such as aluminum nitride (AlN) or lead zirconate titanate (PZT). According to some examples, the acoustic receiver system 104 may be, or may include, an ultrasonic receiver array. The acoustic receiver system 104 may, in some examples, include an array of ultrasonic transducer elements, such as an array of PMUTs, an array of CMUTs, etc. In some such examples, a piezoelectric receiver layer, PMUT elements in a single-layer array of PMUTs, or CMUT elements in a single-layer array of CMUTs, may be used as ultrasonic transmitters (such as those that are included in acoustic transmitter system 102) as well as ultrasonic receivers. In some examples, the apparatus 100 may include one or more separate ultrasonic transmitter elements or one or more separate arrays of ultrasonic transmitter elements.

In the context of the present disclosure, a transmitter element and a receiver element may collectively or individually be referred to as a "sensing element," an "acoustic sensing element," a "sensor element," or an "acoustic sensor element." Such an element may also refer to a transceiver element or an acoustic transceiver element. In some instances, the foregoing terms may refer collectively, for example as a sensing element 120, to a transmitter element (e.g., of an acoustic transmitter system 102) and a receiver element (e.g., of an acoustic receiver system 104) that share the same piezoelectric layer.

In some other embodiments, the acoustic receiver system 104 may include one or more microphones configured to detect acoustic signals. Each microphone may be a MEMS (micro-electromechanical system) microphone having an inlet port, a cavity, and/or a membrane or mesh to facilitate detection and receipt of acoustic signals, e.g., sound waves. In some implementations, the microphone(s) may be part of another apparatus or system other than the apparatus 100, such as the interface system 108 described below.

Accordingly, embodiments of apparatus 100 may be configured to operate as ultrasound sensors that are configured to receive reflected acoustic signals such as ultrasonic waves. Reflected ultrasonic waves may include scattered waves, specularly reflected waves, or both scattered waves and specularly reflected waves. The reflected waves can provide acoustic data, including information about the object, e.g., a finger's ridges and valleys and their shapes and patterns.

More specifically, in some embodiments, control system 106 may be configured to receive the acoustic data (e.g., from acoustic receiver system 104) and/or generate images (e.g., three-dimensional images) representative of the object such as a finger. That is, fingerprint imaging may be performed using the acoustic data received by the acoustic receiver system 104. Images may be matched to a reference to identify the fingerprint image.

In some examples, the control system 106 may be communicatively coupled to a light source system (not shown) and configured to control the light source system to emit light towards a target object (such as a finger) on an outer surface of the display system 101. In some such examples, the control system 106 may be communicatively coupled to and configured to receive signals from the acoustic receiver system 104 (including one or more receiver elements, such as sensor elements 362) corresponding to the ultrasonic waves generated by the target object responsive to the light from the light source system.

In the context of fingerprint sensing, ultrasonic fingerprint sensing may advantageously be more reliable and secure (e.g., for storing user identifying information), and have a smaller and more flexible footprint, than other types of fingerprint sensing such as traditional optical fingerprint scanning that relies on optical imaging.

Some implementations of the apparatus 100 may include an interface system 108. In some examples, the interface system 108 may include a wireless interface system. In some implementations, the interface system 108 may include a user interface system, one or more network interfaces, one or more communication interfaces between the control system 106 and a memory system and/or one or more interfaces between the control system 106 and one or more external device interfaces (such as ports or applications processors), or combinations thereof. According to some examples in which the interface system 108 is present and includes a user interface system, the user interface system may include a microphone system (including, e.g., one or more microphones), a loudspeaker system, a haptic feedback system, a voice command system, one or more displays, or combinations thereof. According to some examples, the interface system 108 may include a touch sensor system, a gesture sensor system, or a combination thereof. The touch sensor system (if present) may be, or may include, a resistive touch sensor system, a surface capacitive touch sensor system, a projected capacitive touch sensor system, a surface acoustic wave touch sensor system, an infrared touch sensor system, any other suitable type of touch sensor system, or combinations thereof.

In some examples, the interface system 108 may include a force sensor system. The force sensor system (if present) may be, or may include, a piezo-resistive sensor, a capacitive sensor, a thin film sensor (for example, a polymer-based thin film sensor), another type of suitable force sensor, or combinations thereof. If the force sensor system includes a piezo-resistive sensor, the piezo-resistive sensor may include silicon, metal, polysilicon, glass, or combinations thereof. An ultrasonic fingerprint sensor and a force sensor system may, in some implementations, be mechanically coupled. In some implementations, the force sensor system may be mechanically coupled to a platen. In some such examples, the force sensor system may be integrated into circuitry of the ultrasonic fingerprint sensor. In some examples, the interface system 108 may include an optical sensor system, one or more cameras, or a combination thereof.

According to some examples, the apparatus 100 may include a noise reduction system 110. In some implementations, the noise reduction system 110 may include one or more sound-absorbing layers, acoustic isolation material, or combinations thereof. In some examples, the noise reduction system 110 may include acoustic isolation material, which may reside between at least a portion of the acoustic transmitter system 102 and at least a portion of the acoustic receiver system 104, e.g., between ultrasonic transmitter elements and ultrasonic receiver elements. In some examples, the noise reduction system 110 may include one or more electromagnetically shielded transmission wires. In some such examples, the one or more electromagnetically shielded transmission wires may be configured to reduce electromagnetic interference from circuitry of the acoustic transmitter system 102, circuitry of the acoustic receiver system 104, or combinations thereof, that is received by the acoustic receiver system 104.

In some implementations, the apparatus 100 may be part of a mobile device. In some implementations, the apparatus 100 may be part of a wearable device configured to be worn by a user, such as around the wrist, finger, arm, leg, ankle, or another appendage, or another portion of the body. In an example implementation, the wearable device may have the form of a wristwatch and can be worn around the wrist.

Figure 2A:
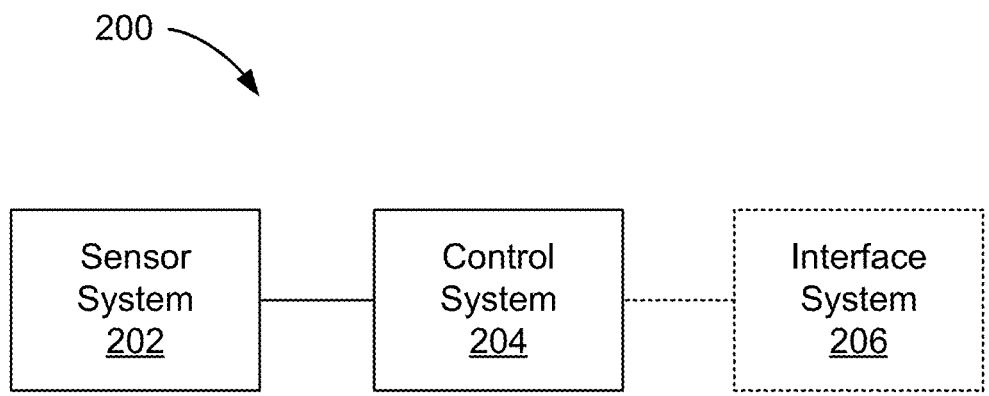
FIG. 2A shows a block diagram representation of components of an example sensing system.

An ultrasonic sensor array may be part of a sensing system of a device, for example, a mobile device. FIG. 2A shows a block diagram representation of components of an example sensing system 200. As shown, the sensing system 200 may include a sensor system 202 and a control system 204 that may, in some implementations, be electrically and/or communicatively coupled to the sensor system 202. In some implementations, control system 204 may include one or more controllers or processors. Control system 204 may be an example of control system 106. In some configurations, the control system 204 may be part of the device having the sensing system. In some configurations, the control system 204 may be part of the sensing system. In some configurations, the control system 204 may be external to the device having the sensing system, for example but not limited to, on a server (cloud), remote storage, or another device other than the device having the sensing system. In some configurations, the one or more controllers or processors may be distributed across two or more devices including external apparatus.

The sensor system 202 (e.g., in conjunction with control system 204, in some implementations) may be capable of detecting the presence of an object, for example a human finger. The sensor system 202 may be capable of scanning an object and providing raw measured image information usable to obtain an object signature, for example, a fingerprint of a human finger (such as 350). The control system 204 may be capable of controlling the sensor system 202 and processing the raw measured image information received from the sensor system. In some implementations, the sensing system 200 may include an interface system 206 capable of transmitting or receiving data, such as raw or processed measured image information, to or from various components within or integrated with the sensing system 200 or, in some implementations, to or from various components, devices or other systems external to the sensing system.

Figure 2B:
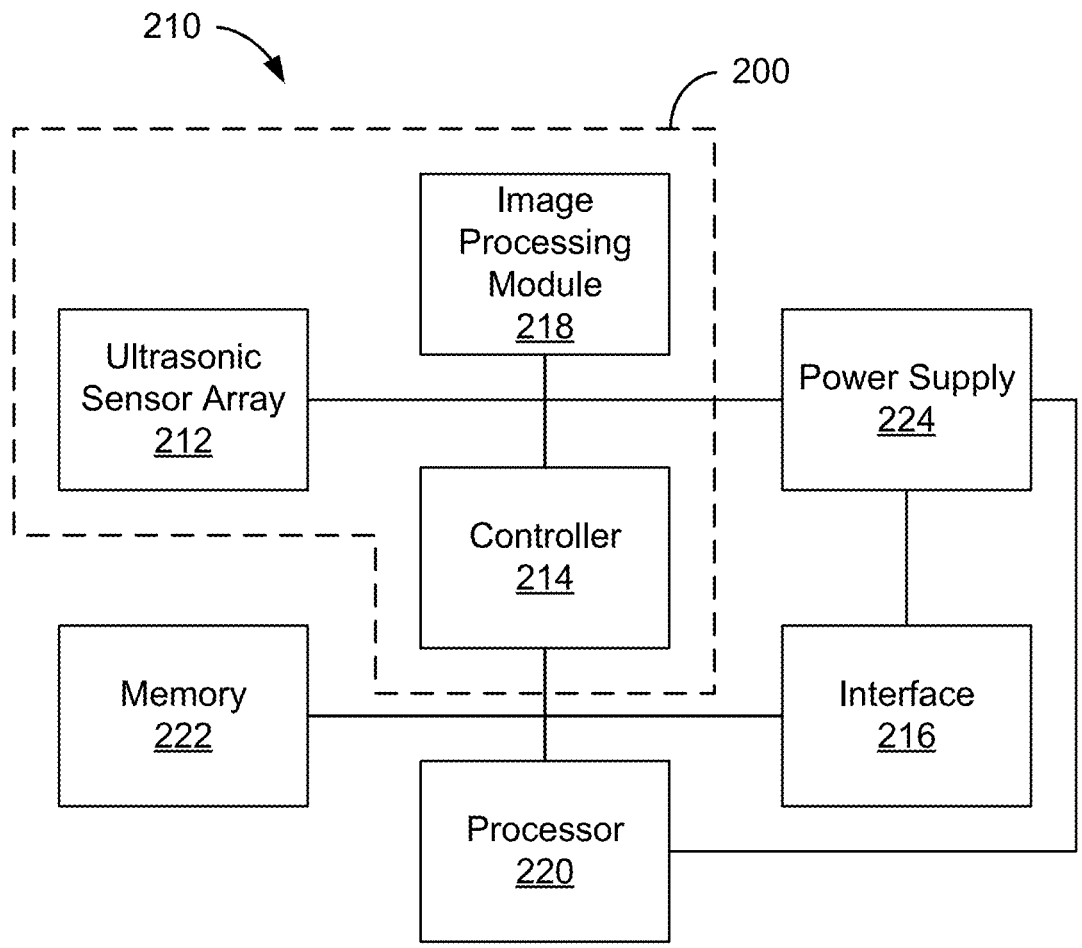
FIG. 2B shows a block diagram representation of components of an example mobile device that includes the sensing system of FIG. 2A.

FIG. 2B shows a block diagram representation of components of an example mobile device 210 that includes the sensing system 200 of FIG. 2A. The sensor system 202 of the sensing system 200 of the mobile device 210 may be implemented with an ultrasonic sensor array 212, such as the ultrasonic sensor array 300 shown in FIG. 3B. The control system 204 of the sensing system 200 may be implemented with a controller 214 that is electrically coupled to the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The sensing system 200 of FIG. 2B may include an image processing module 218. In some implementations, raw measured image information provided by the ultrasonic sensor array 212 may be sent, transmitted, communicated or otherwise provided to the image processing module 218. The image processing module 218 may include any suitable combination of hardware, firmware and software configured, adapted or otherwise operable to process the image information provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive or active analog filters, among others. In some implementations, one or more of such circuits or circuit components may be integrated within the controller 214, for example, where the controller 214 is implemented as a system-on-chip (SoC) or a system-in-package (SIP). In some implementations, one or more of such circuits or circuit components may be integrated within a DSP included within or coupled to the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general purpose processor or a DSP).

In some implementations, in addition to the sensing system 200, the mobile device 210 may include a separate processor 220 such as an applications processor, a memory 222, an interface 216 and a power supply 224. In some implementations, the controller 214 of the sensing system 200 may control the ultrasonic sensor array 212 and the image processing module 218, and the processor 220 of the mobile device 210 may control other components of the mobile device 210. In some implementations, the processor 220 may communicate data to the controller 214 including, for example, instructions or commands. In some such implementations, the controller 214 may communicate data to the processor 220 including, for example, raw or processed image information. It should also be understood that, in some other implementations, the functionality of the controller 214 may be implemented entirely, or at least partially, by the processor 220. In some such implementations, a separate controller 214 for the sensing system 200 may not be required because the functions of the controller 214 may be performed by the processor 220 of the mobile device 210.

Depending on the implementation, one or both of the controller 214 and processor 220 may store data in the memory 222. For example, the data stored in the memory 222 may include raw measured image information, filtered or otherwise processed image information, estimated PSF or estimated image information, and final refined PSF or final refined image information. The memory 222 may store processor-executable code or other executable computer-readable instructions capable of execution by one or both of the controller 214 and the processor 220 to perform various operations (or to cause other components such as the ultrasonic sensor array 212, the image processing module 218, or other modules to perform operations), including any of the calculations, computations, estimations or other determinations described herein (including those presented in any of the equations below). It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based Flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image information or data derived or otherwise determined from image information. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the mobile device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the mobile device 210. Additionally or alternatively, the power supply 224 may be wirelessly chargeable.

As used herein, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the sensing system.

FIG. 3A illustrates a side view of an example configuration of an ultrasonic sensor array of sensor elements which is capable of ultrasonic imaging. FIG. 3A depicts an ultrasonic sensor array 300 with an array of sensor elements configured as transmitting and receiving elements that may be used for ultrasonic imaging. In some implementations, the ultrasonic sensor array 300 may be an example of or a portion of a sensor element or a sensor as discussed herein.

Sensor elements 362 on a sensor array substrate 360 may emit and detect ultrasonic waves. As illustrated, an ultrasonic wave 364 may be transmitted from at one or more sensor elements 362. The ultrasonic wave 364 may travel through a propagation medium such as an acoustic coupling medium 365 and a platen 390 towards an object 350 such as a finger or a stylus positioned on an outer surface of the platen 390. A portion of the ultrasonic wave 364 may be transmitted through the platen 390 and into the object 350, while a second portion is reflected from the surface of platen 390 back towards a sensor element 362. The amplitude of the reflected wave may depend in part on the acoustic properties of the object 350 and the platen 390. The reflected wave may be detected by the sensor elements 362, from which an image of the object 350 may be acquired. For example, with sensor arrays having a pitch of about 50 microns (about 500 pixels per inch), ridges and valleys of a fingerprint may be detected. An acoustic coupling medium 365, such as an adhesive, gel, a compliant layer or other acoustic coupling material may be provided to improve coupling between an array of sensor elements 362 disposed on the sensor array substrate 360 and the platen 390. The acoustic coupling medium 365 may aid in the transmission of ultrasonic waves to and from the sensor elements 362. The platen 390 may include, for example, a layer of glass, plastic, sapphire, metal, metal alloy, or other platen material. An acoustic impedance matching layer (not shown) may be disposed on an outer surface of the platen 390. The platen 390 may include a coating (not shown) on the outer surface. In some implementations, sensor elements may be co-fabricated with thin-film transistor (TFT) circuitry or CMOS circuitry on or in the same substrate, which may be a silicon, silicon on insulator (SOI), glass or plastic substrate, in some examples. The TFT, silicon or semiconductor substrate may include row and column addressing electronics, multiplexers, local amplification stages and control circuitry.

Figure 3B:
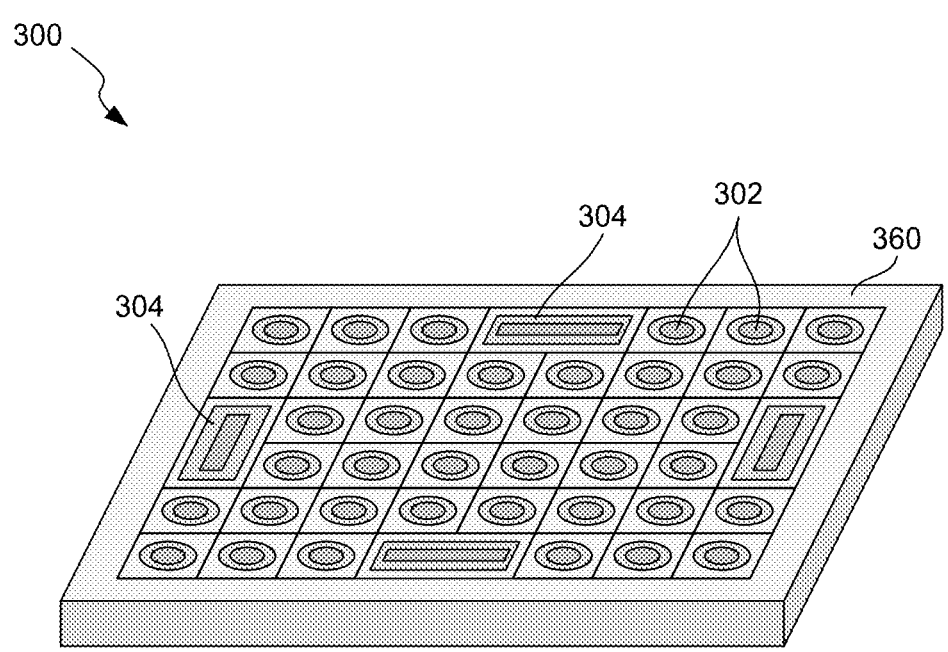
FIG. 3B shows an example configuration of ultrasonic sensor array.

FIG. 3B shows an example configuration of an ultrasonic sensor array including sensor elements 302 and sensor elements 304 formed on a substrate 360. Substrate 360 may be an example of the sensor array substrate 360 mentioned above. The sensor elements 302 are shown as circular sensor elements. In some implementations, the sensor elements 302 are not used for force detection in the non-ultrasonic force detection mode. Sensor elements 304 are larger than the sensor elements 302 and are shown as rectangular. It will be understood that these sensor elements 302, 304 may be any appropriate shape and size. In some implementations, the sensor elements 304 that are used for non-ultrasonic force detection may be larger than the sensor elements 302 that are used solely for ultrasonic imaging. The sensor elements 304, used during non-ultrasonic force detection mode to detect applied force as described above, are located on the periphery of the ultrasonic sensor array 300. By placing the sensor elements 304 used for force detection around the periphery, the ultrasonic sensor array may be used for centering detection. While only the sensor elements 304 are used for non-ultrasonic force detection, both sensor elements 302 and sensor elements 304 may be used for ultrasonic imaging as described above with respect to FIG. 3A. That is, the sensor elements 304 may initially be used to statically detect force from a finger press and then be switched to an ultrasonic mode for ultrasonic imaging in some implementations. In alternative implementations, the sensor elements 304 may be used only for force detection, with only the sensor elements 302 used for ultrasonic imaging. In some implementations, sensor elements 304 near the periphery of the ultrasonic sensor array 300 may be used for cursor, pointer or icon control, or for screen navigation on a display of a mobile device. In some implementations, some or all of sensor elements 302, 304, 362 in FIGS. 3A and 3B may be piezoelectric micromachined ultrasonic transducers (PMUT) and/or capacitive micromachined ultrasonic transducers (CMUT) sensor elements.

Example Layers of Material with Microlens Structures

Figure 4:
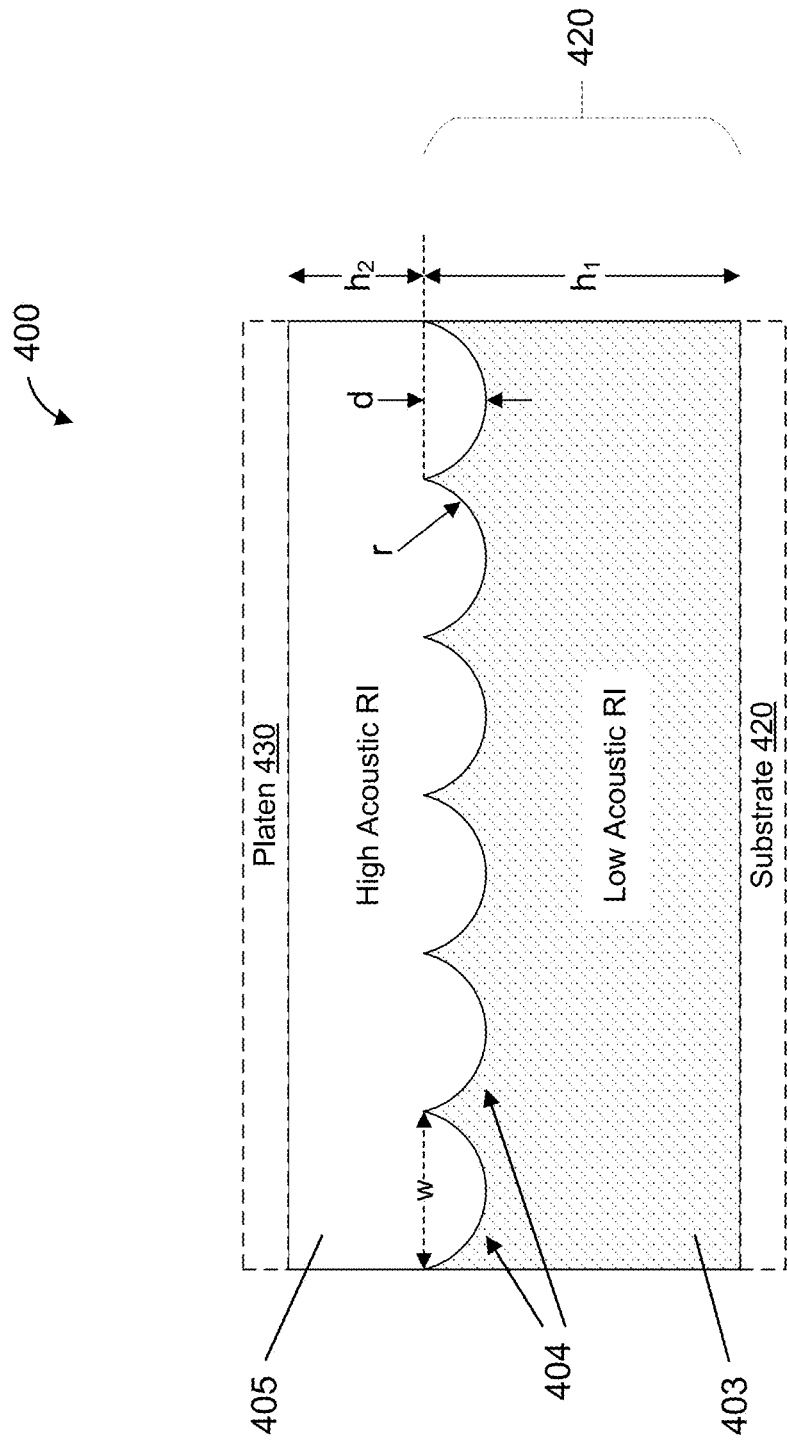
FIG. 4 shows a cross-sectional diagram of at least a portion of a sensor stack having a first layer of material, microlens structures at a surface of the first layer of material, and a second layer of material, according to some embodiments.

FIG. 4 shows a cross-sectional diagram of at least a portion of a sensor stack 400 having a first layer of material 403, microlens structures 404 at a surface of the first layer of material 403, and a second layer of material 405, according to some embodiments. The first layer of material 403 may be an example of the layer of material 103 described above. The second layer of material 405 may be an example of the layer of material 105 described above. The microlens structures 404 may be examples of the one or more microlens structures described above.

In some embodiments, the microlens structures 404 may be concave microlens structures. That is, the curvature of the microlens structures 404 may protrude into the first layer of material 403. The microlens structures 404 may be constructed so as to redirect or refract acoustic signals (e.g., ultrasonic waves) in various directions, which may be useful for improving acoustic signaling performance as discussed in greater detail below with respect to FIG. 5.

In some examples, the microlens structures 404 may have a radius (r) of about 100 μm (or, e.g., about 80 to 120 μm), a height or depth (d) of about 30 μm (or, e.g., about 20 to 40 μm), and a width (w) of about 60 μm (or, e.g., about 40 to 80 μm). Other such physical parameters may be possible.

In some embodiments, the first layer of material 403 may have a low acoustic RI (higher speed of sound). For example, the first layer of material 403 may be composed of glass, fused silica, titanium dioxide, silicon carbide, or a high-index polymer, as a few examples from Table 1. However, in other examples, another type of material having a low acoustic RI, such as one of those listed in Table 1 having an acoustic RI that does not exceed a threshold for a low acoustic RI (e.g., up to 0.1, up to 0.09, up to 0.06, up to 0.05, or up to 0.02) may be selected. In some approaches, the first layer of material 403 may be doped with particles to increase the speed of sound through the first layer of material 403 (and thus decrease its acoustic RI). For instance, carbon nanotubes may be added to the first layer of material 403 as a dopant.

In some implementations, the first layer of material 403 may be disposed on a separate substrate 420, which may include a TFT layer. For example, the first layer of material 403 may be separate from a substrate 420 having TFTs (e.g., Si-TFT) disposed thereat. However, in some embodiments, the substrate 420 (e.g., with TFT layer) may include the first layer of material 403. That is, in some implementations, the substrate 420 may be composed of the first layer of material 403, which may have a low acoustic RI, as noted above.

In some embodiments, the second layer of material 405 may have a higher acoustic RI (lower speed of sound). For example, the second layer of material 405 may be composed of acrylate, propionate, acetate, aerogel, or siloxane, as a few examples. However, in other examples, another type of material having a high acoustic RI, such as one of those listed in Table 1 having an acoustic RI that meets or exceeds a threshold for a high acoustic RI (e.g., at least 0.01, at least 0.02, or at least 1) may be selected. In some implementations, the second layer of material 405 (or other materials having a high acoustic RI) may be modified in such a way that the speed at which sound may propagate through the material is reduced (increasing the acoustic RI) by, e.g., changing the ratio of the constituents. For example, the ratio of resin and particles in an epoxy may be changed (e.g., by adding more resin) to make the epoxy softer and thereby increase the acoustic RI.

In some configurations, the first layer of material 403 may have a relatively lower acoustic RI than the relatively higher acoustic RI of the second layer of material 405. According to a discussion elsewhere above, the acoustic RI of the first layer of material 403 need not be considered "low" as long as it is lower than that of the second layer of material 405. Similarly, the acoustic RI of the second layer of material 405 need not be considered "high" as long as it is higher than that of the first layer of material 403. It may be the case in some configurations that, even if the values of acoustic RI of both layers are considered "high" or "low," the second layer of material 405 has an acoustic RI that is relatively higher than that of the first layer of material 403. That is to say, the second layer of material 405 need not be selected from a material having a "high" acoustic RI as long as its acoustic RI is higher than that of the first layer of material 403. Similarly, the first layer of material 403 need not be selected from a material having a "low" acoustic RI, and the first layer of material 403 may have a relatively lower acoustic RI than that of the second layer of material 405.

As long as the acoustic RI values are different and appropriate for the concavity of the one or more microlens structures, various materials may be selected to implement relatively higher or lower acoustic RI, with a lower acoustic RI for the first layer of material 403 and a higher acoustic RI for the second layer of material 405. In some cases, the difference in acoustic RI values may be, for example, about 0.04 or 0.10 or in between.

In some embodiments, the first layer of material 403 may have a prescribed thickness or height $h_1$. In some examples, $h_1$ may include the depth (d) of the curvature of the concave microlens structures 404, and may be between about 50-500 μm, e.g., about 500 μm. In some embodiments, the second layer of material 405 may have a prescribed thickness or height $h_2$. In some examples, $h_2$ may exclude the depth of the curvature, and may be about 50-500 μm. In other examples, $h_1$ may exclude at least a portion of the depth of the curvature, and/or $h_2$ may include at least a portion of the depth of the curvature. Note, however, that $h_1$ and $h_2$ (as well as d, r and w) may not be to scale. The Figures may purely illustrate the structure and the relative locations of components. As an example, while $h_2$ appears to be thinner than $h_1$, $h_2$ may in some cases be thicker than $h_1$ (and vice versa) and by multiple times in some cases.

In some implementations, a platen 430 may be disposed over the second layer of material 405. While shown in FIG. 4 to illustrate the relative positions of the layers and components, in some implementations, there may be additional one or more layers between the second layer of material 405 and the platen 430, such as one or more adhesive layers, one or more protective films, a light-emitting layer, polarizer, backplate, stiffening layer, etc.

Figure 5:
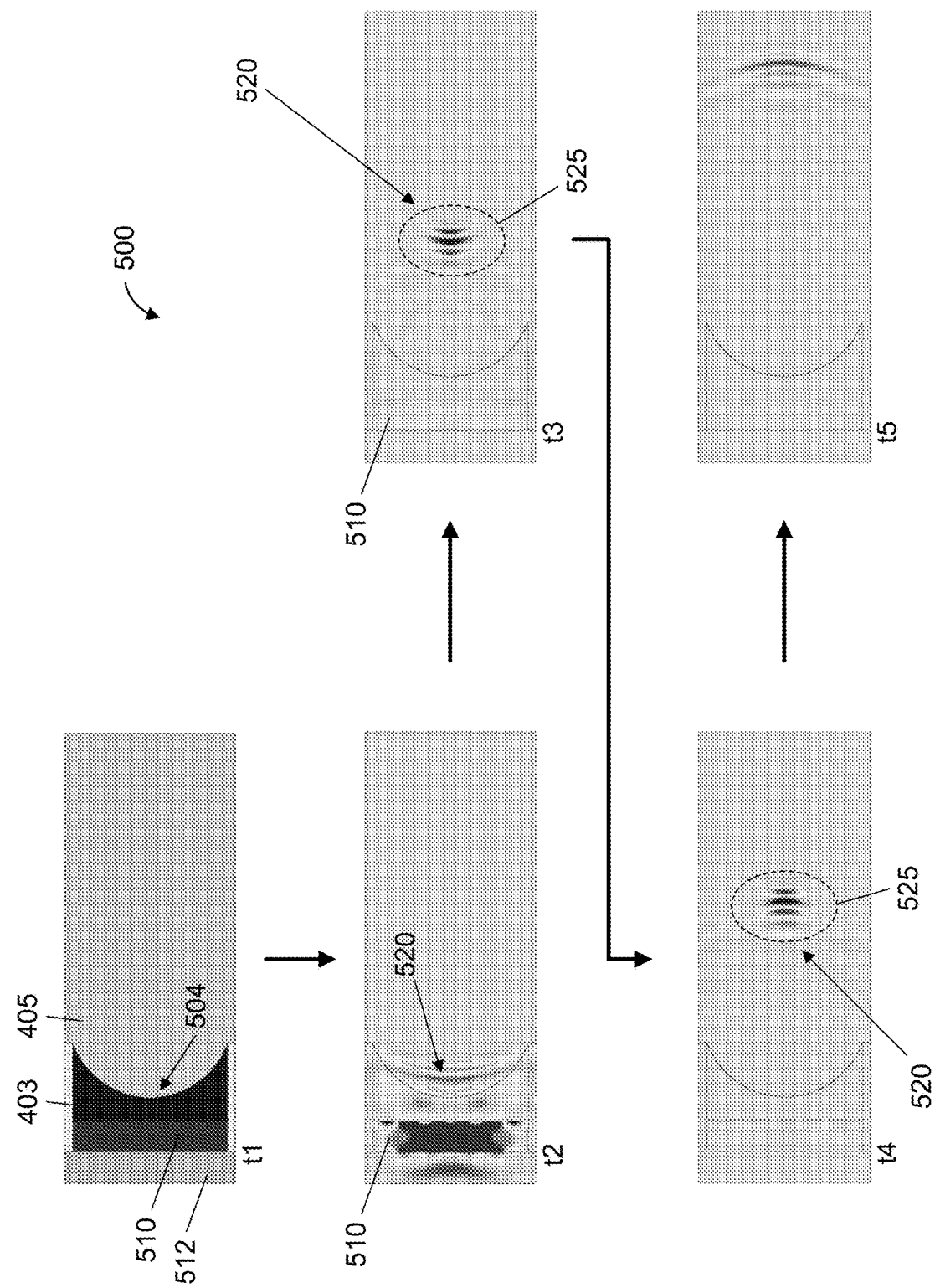
FIG. 5 depicts an example sequence of a propagating acoustic signal from a concave microlens structure.

FIG. 5 depicts an example sequence 500 of a propagating acoustic signal from a microlens structure 504. The example sequence 500 illustrates five time points from time t1 through time t5, which may not be necessarily spaced apart temporally equally.

The microlens structure 504 in example sequence 500 may have a concave shape and may be an example of microlens structure 404. Hence, the microlens structure 504 in example sequence 500 may be disposed at a first layer of material (e.g., the first layer of material 403) having a lower acoustic RI than a second layer of material (e.g., the second layer of material 405).

At time t1, a piezoelectric material 510 may generate an acoustic signal 520 (e.g., an ultrasonic wave), e.g., as a result of voltage or electrical signal being applied to one or more acoustic transmitter elements (e.g., portions of TFT circuitry). The piezoelectric material 510 may be disposed adjacent to a backing layer 512. The backing layer 512 may be constructed of a polymer and may provide a degree of physical protection to the piezoelectric material 510, the first layer of material 403, the microlens structure 504, and/or the second layer of material 405, as well as improvement in performance by stabilizing or reducing forces such as stress and strain to said components, especially during bending or other deformation. Deformation can occur even without motion, such as from pressure underwater (e.g., in a wearable and/or water-resistant device (e.g., smartwatch)).

At time t2, the acoustic signal 520 may be emitted from piezoelectric material 510 and being propagating through the first layer of material and the second layer of material.

At time t3, it may be seen that the acoustic signal 520 advantageously forms a focused pressure wave that may have a noticeably larger signal (e.g., having about 3-10 or 5-20 higher decibel (dB) compared to an acoustic signal without the microlens structure 504). The degree to which the signal is larger may depend on radius, width, other physical parameters, materials used, etc. In certain applications, flexible devices, such as foldable display, may experience low or weak acoustic signal propagation through such flexible device or display. In such applications, forming a larger, focused acoustic signal may advantageously enable reliable transmission of acoustic signals.

In some scenarios, the larger signal may be caused at least by a combination of physical factors: (1) a concave microlens structure, (2) the first layer of material (adjacent to the piezoelectric material 510) having a lower acoustic RI, and (3) the second layer of material having a higher acoustic RI. The extent to which the acoustic RI values between the first and second layers of material are different may also contribute to the larger acoustic signal 520.

At time t4, the acoustic signal 520 may continue propagation. At time t5, the acoustic signal 520 may dissipate or scatter as it travels through various media (e.g., other than the first and/or second layer of material).

It is also notable that the acoustic signal 520 may be largest at particular location(s), e.g., focused region 525. Diffraction and redirection of the acoustic signal 520 by the microlens structure 504 may contribute to forming a focused pressure wave at focused region 525. Depending on the configurations of parameters (acoustic RI values of first and second layers of materials, d, r, w, $h_1$, $h_2$, quantity of microlens structures, etc.), the location of focused region 525 may be different. It may be advantageous to place a platen (e.g., platen 430) or other surface at which a target object of interest may be (e.g., a body part of a user such as a finger) near the location(s) where the acoustic signal 520 would be the largest.

Other configurations having a different advantageous combination of structures and physical factors may be implemented, as discussed below.

Figure 6:
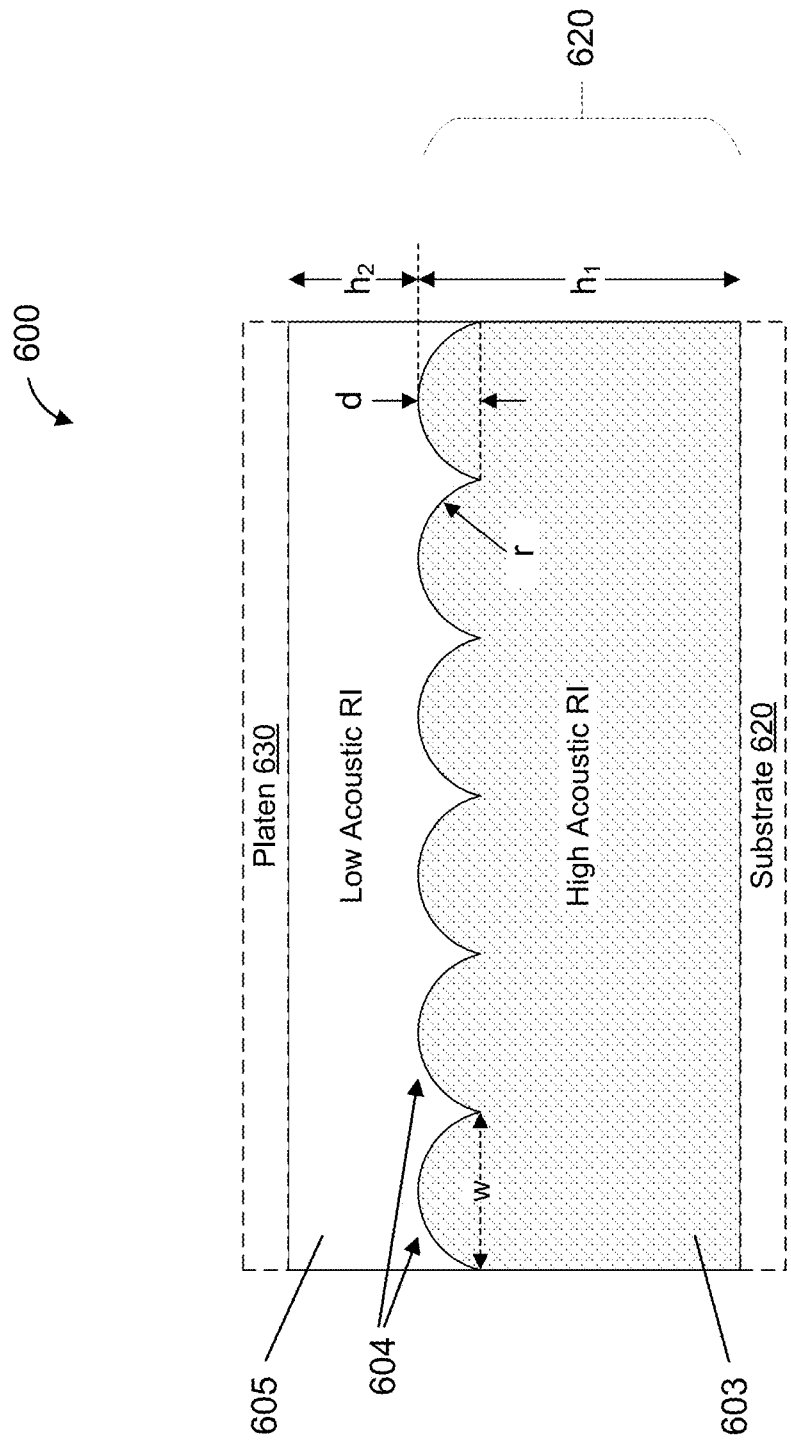
FIG. 6 shows a cross-sectional diagram of at least a portion of a sensor stack having a first layer of material, microlens structures at a surface of the first layer of material, and a second layer of material, according to some embodiments.

FIG. 6 shows a cross-sectional diagram of at least a portion of a sensor stack 600 having a first layer of material 603, microlens structures 604 at a surface of the first layer of material 603, and a second layer of material 605, according to some embodiments. The first layer of material 603 may be an example of the layer of material 103 described above. The second layer of material 605 may be an example of the layer of material 105 described above. The microlens structures 604 may be examples of the one or more microlens structures described above.

In some embodiments, the microlens structures 604 may be convex microlens structures. That is, the curvature of the microlens structures 604 may protrude out of the first layer of material 603, into the second layer of material 605. The microlens structures 604 may be constructed so as to redirect or refract acoustic signals (e.g., ultrasonic waves) in various directions, which may be useful for improving acoustic signaling performance as discussed in greater detail below with respect to FIG. 7.

In some implementations, the microlens structures 604 may have a radius (r) of about 100 μm, a height or depth (d) of about 30 μm, a width (w) of about 60 μm, and a pitch between microlens structures 604 of about 5 and 500 μm (e.g., between about 100 and 200 μm).

In some embodiments, the first layer of material 603 may have a high acoustic RI (lower speed of sound). For example, the first layer of material 603 may be composed of acrylate, propionate, acetate, aerogel, or siloxane, as a few examples. However, in other examples, another type of material having a high acoustic RI, such as one of those listed in Table 1 having an acoustic RI that meets or exceeds a threshold for a high acoustic RI (e.g., at least 0.01, at least 0.02, or at least 1) may be selected. In some implementations, a material having a high acoustic RI may be modified (increase its acoustic RI) by, e.g., adjusting the ratio of constituents such as resin and particle for an epoxy. The amount of resin could be increased to reduce the speed of sound, for instance.

In some implementations, the first layer of material 603 may be disposed on a separate substrate 620, which may include a TFT layer. For example, the first layer of material 603 may be separate from a substrate 620 having TFTs (e.g., Si-TFT) disposed thereat. However, in some embodiments, the substrate 620 (e.g., with TFT layer) may include the first layer of material 603. That is, in some implementations, the substrate 620 may be composed of the first layer of material 603, which may have a high acoustic RI, as noted above.

In some embodiments, the second layer of material 605 may have a low acoustic RI (higher speed of sound). For example, the second layer of material 605 may be composed of glass, fused silica, titanium dioxide, silicon carbide, or a high-index polymer, as a few examples. However, in other examples, another type of material having a low acoustic RI, such as one of those listed in Table 1 having an acoustic RI that does not exceed a threshold for a low acoustic RI (e.g., up to 0.1, up to 0.09, up to 0.06, up to 0.05, or up to 0.02) may be selected. In some approaches, the second layer of material 605 may be doped with particles to increase the increase the speed of sound through the second layer of material 605 (lowering its acoustic RI).

However, it may be the case in some configurations that the second layer of material 605 has an acoustic RI that is relatively lower than that of the first layer of material 603 even if the values of acoustic RI of both layers are considered "high" or "low." That is to say, the second layer of material 605 need not be selected from a material having a "low" acoustic RI if its acoustic RI is lower than that of the first layer of material 603. Similarly, the first layer of material 603 need not be selected from a material having a "high" acoustic RI if the first layer of material 603 has a relatively higher acoustic RI than that of the second layer of material 605.

As long as the acoustic RI values are different and appropriate for the concavity or convexity of the one or more microlens structures, various materials may be selected to implement relatively higher or lower acoustic RI, with a higher acoustic RI for the first layer of material 603 and a lower acoustic RI for the second layer of material 605. In some examples, the difference in acoustic RI values may be, for example, about 0.001 or 0.3 or in between.

In some embodiments, the first layer of material 603 may have a prescribed thickness or height $h_1$. In some examples, $h_1$ may include the height (d) of the curvature of the microlens structures 604, and may be between about 50-500 μm, e.g., about 500 μm. In some embodiments, the second layer of material 605 may have a prescribed thickness or height $h_2$. In some examples, $h_2$ may exclude the height of the curvature, and may be about 50-500 μm. In other examples, $h_1$ may exclude at least a portion of the height of the curvature, and/or $h_2$ may include at least a portion of the height of the curvature. Note, however, that $h_1$ and $h_2$ (as well as d, r and w) may not be to scale. These parameters may purely to illustrate the structure and the relative locations of components. As an example, while $h_2$ appears to be thinner than $h_1$, $h_2$ may in some cases be thicker than $h_1$ (and vice versa) and by multiple times in some cases.

In some implementations, a platen 630 may be disposed over the second layer of material 605. While shown in FIG. 6 to illustrate the relative positions of the layers and components, in some implementations, there may be additional one or more layers between the second layer of material 605 and the platen 630, such as one or more adhesive layers, one or more protective films, a light-emitting layer, polarizer, backplate, stiffening layer, etc.

Figure 7:
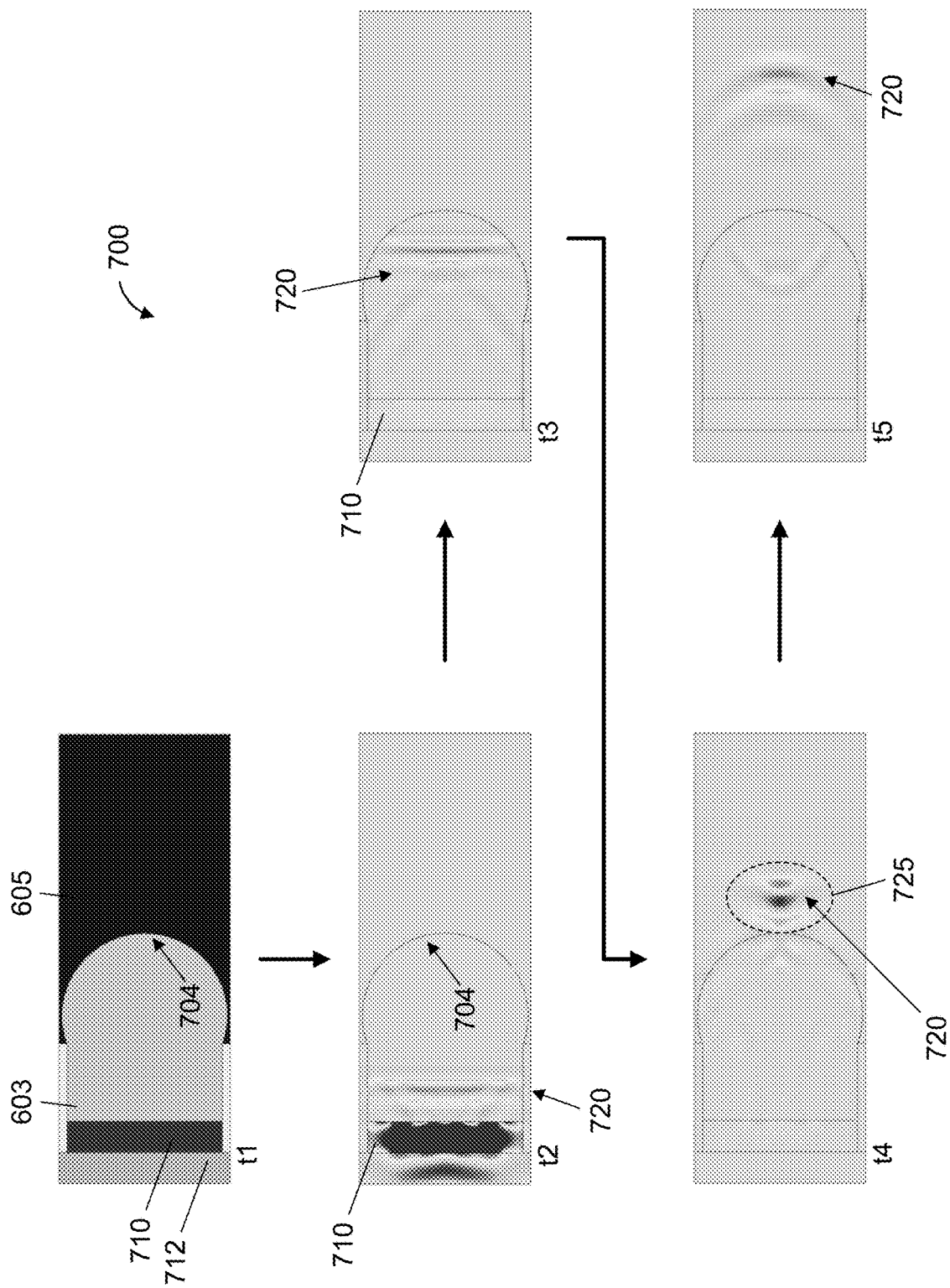
FIG. 7 depicts an example sequence of a propagating acoustic signal from a convex microlens structure.

FIG. 7 depicts an example sequence 700 of a propagating acoustic signal from a microlens structure 704. The example sequence 700 illustrates five time points from time t1 through time t5, which may not be necessarily spaced apart temporally equally.

The microlens structure 704 in example sequence 700 may have a convex shape and be an example of microlens structure 604. Hence, the microlens structure 704 in example sequence 700 may be disposed at a first layer of material (e.g., the first layer of material 603) having a higher acoustic RI than a second layer of material (e.g., the second layer of material 605).

At time t1, a piezoelectric material 710 may generate an acoustic signal 720 (e.g., an ultrasonic wave), e.g., as a result of voltage or electrical signal being applied to one or more acoustic transmitter elements (e.g., portions of TFT circuit). A backing layer 712, which may be an example of the backing layer 512, may be present adjacent to the piezoelectric material 710.

At times t2 and t3, the acoustic signal 720 may begin emitting and traveling through the first layer of material.

At time t4, the acoustic signal 720 may advantageously form a focused pressure wave that has a larger signal (e.g., about 3-10 or 5-20 dB higher than without the microlens structure 704) at a focused region 725. Forming a larger, focused acoustic signal may advantageously enable reliable transmission of acoustic signals through certain devices, such as flexible devices, e.g., foldable displays. Diffraction and redirection of the acoustic signal 720 by the microlens structure 704 may contribute to forming a focused pressure wave at focused region 725. Depending on the configurations of parameters (acoustic RI of first and second layers of materials, d, r, w, $h_1$, $h_2$, quantity of microlens structures, etc.), the location of focused region 725 may be different. It would be advantageous to place a platen (e.g., platen 630) or other surface at which a target object of interest may be (e.g., a body part of a user such as a finger) near the location(s) where the acoustic signal 720 would be the largest.

In some scenarios, the larger signal may be caused at least by a combination of physical factors: (1) a convex microlens structure, (2) the first layer of material having a higher acoustic RI, and (3) the second layer of material having a lower acoustic RI. The extent to which the acoustic RI values between the first and second layers of material are different may also contribute to the larger acoustic signal 720.

Note that the particular combination of physical factors in example sequence 700 using the microlens structure 704 may be different in multiple ways from the particular combination of physical factors in example sequence 500 using microlens structure 504. More specifically, the microlens structure 504 may have a concave curvature at a first layer of material having a lower acoustic RI than that of the second layer of material, while the microlens structure 704 may have a convex curvature at a first layer of material having a higher acoustic RI than that of the second layer of material. More directly, both (i) the concavity or convexity of the microlens structures, and (ii) which of the first or second layers of material has a higher or lower acoustic RI than the other, may be factors that influence the formation of a focused pressure wave.

At time t5, the acoustic signal 720 may begin to dissipate or scatter as it travels through various media (e.g., other than the first and/or second layer of material).

In some cases, the acoustic signal 520 from FIG. 5 may have a different acoustic signal strength at focused region 525 than the acoustic signal 720 at its focused region 725.

Nevertheless, these particular combinations of physical factors shown in FIGS. 4 and 6 may bring about aforementioned advantages of forming a focused pressure wave. Some combinations may not form any advantageously focused pressure wave having a larger signal. Therefore, at least the constructions illustrated and described herein bring about benefits that other configurations may not have.

Figure 8:
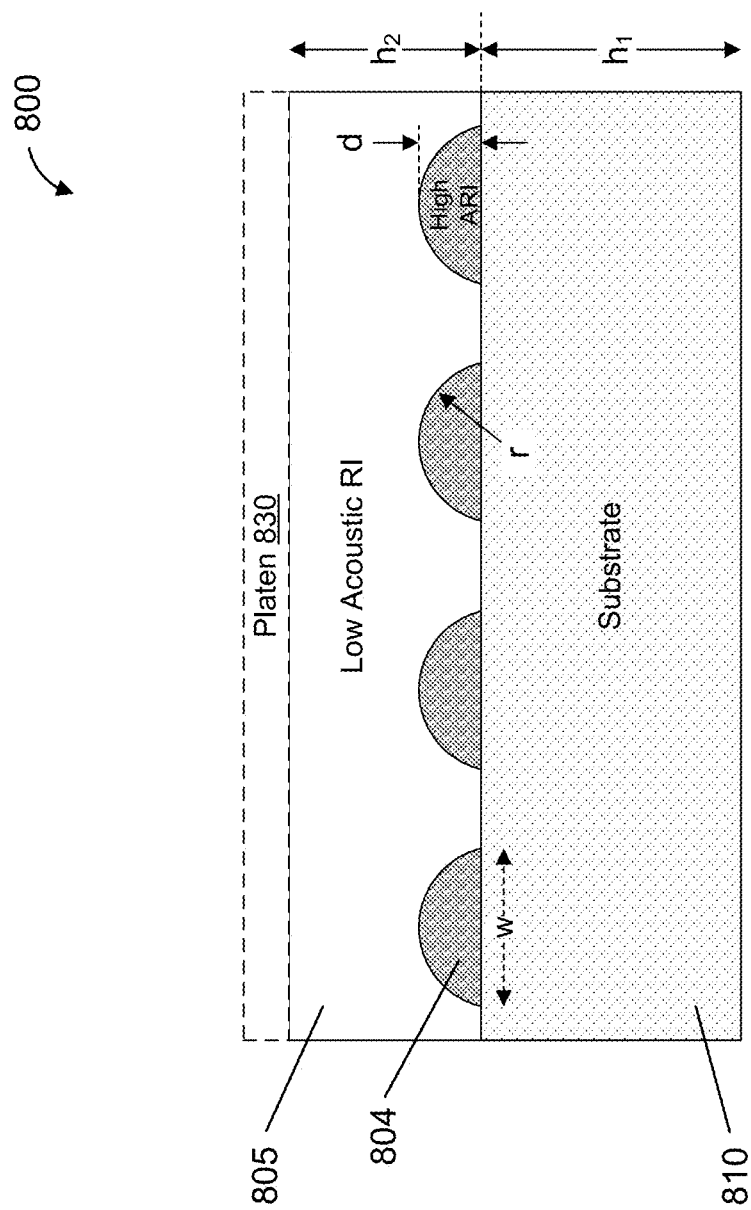
FIG. 8 shows a cross-sectional diagram of at least a portion of a sensor stack having a first layer of material, microlens structures formed on a surface of the first layer of material, and a second layer of material, according to some embodiments.

FIG. 8 shows a cross-sectional diagram of at least a portion of a sensor stack 800 having a substrate 810, microlens structures 804 formed on a surface of the substrate 810, and a second layer of material 805, according to some embodiments. The microlens structures 804 may be examples of the one or more microlens structures described herein. The second layer of material 405 may be an example of the layer of material 105 described above.

In some embodiments, the microlens structures 804 may be convex microlens structures. That is, the curvature of the microlens structures 804 may protrude into the second layer of material 805. In some implementations, the microlens structures 804 may be separate from the substrate 810. In other implementations, however, the microlens structures 804 may be part of and unitary with the substrate 810 and protrude from the substrate 810.

In some embodiments, the microlens structures 804 may have a radius (r) of about 100 µm, a height or depth (d) of about 30 µm, and a width (w) of about 60 µm, and a pitch between microlens structures 804 of about 5 and 500 µm (e.g., between about 100 and 200 µm). In some embodiments, the substrate 810 may have a prescribed thickness or height $h_1$, which may be between about 50-500 µm, e.g., about 500 µm. The second layer of material 805 may have a prescribed thickness or height $h_2$, which may be between about 50-500 µm. Note, however, that $h_1$ and $h_2$ (as well as d, r and w) may not be to scale. These parameters may purely to illustrate the structure and the relative locations of components. As an example, while $h_2$ appears to be thinner than $h_1$, $h_2$ may in some cases be thicker than $h_1$ (and vice versa) and by multiple times in some cases.

In some embodiments, the microlens structures 804 may be composed of a material having a high acoustic RI (lower speed of sound). For example, the microlens structures 804 may be composed of acrylate, propionate, acetate, aerogel, or siloxane, as a few examples. However, in other examples, another type of material having a high acoustic RI, such as one of those listed in Table 1 having an acoustic RI that meets or exceeds a threshold for a high acoustic RI (e.g., at least 0.01, at least 0.02, or at least 1) may be selected. In some implementations, the high acoustic RI material may be modifiable as noted elsewhere herein.

In some embodiments, the substrate 810 may be a glass substrate. Hence, the substrate 810 may possess a relatively low acoustic RI (0.056-0.061 for glass according to Table 1). In some cases, the substrate 810 may have a relatively higher acoustic RI than that of the second layer of material 805 (or even the microlens structures 804 in some configurations). In some cases, the substrate 810 may have a relatively lower acoustic RI than that of the microlens structures 804 (or even the second layer of material 805 in some configurations). For example, the acoustic RI value of 0.056-0.061 of a glass substrate would be higher than that of a second layer of material 805 composed of silicon carbide, which has an acoustic RI of 0.026-0.038.

In other embodiments, the substrate 810 may be a Si-based substrate such as a Si-TFT substrate, or a polymer-based substrate.

In various examples, the microlens structures 804 may be composed of acrylate, propionate, acetate, aerogel, or siloxane, or another material having a high acoustic RI, such as one of those listed in Table 1 having an acoustic RI that meets or exceeds a threshold for a high acoustic RI (e.g., at least 0.01, at least 0.02, or at least 1). In various examples, the second layer of material 805 may be composed of glass, fused silica, titanium dioxide, silicon carbide, or a high-index polymer, or another material having a low acoustic RI, such as one of those listed in Table 1 having an acoustic RI does not exceed a threshold for a low acoustic RI (e.g., up to 0.1, up to 0.09, up to 0.06, up to 0.05, or up to 0.02). In some approaches, the second layer of material 805 may be doped with particles to increase the speed of sound through the second layer of material 805 (and thus decrease its acoustic RI). In some approaches, the substrate 810 may be doped to decrease the speed of sound, which would correlate to an increase its acoustic RI.

Regardless, similar to the sensor stack 600 shown in FIG. 6, acoustic signals (e.g., ultrasonic waves) may propagate from a convex microlens structure having a high(er) acoustic RI to a second layer of material having a low(er) acoustic RI. The acoustic RI value of the substrate 810 may be variable as long as an acoustic propagation path exists through the microlens structures 804 having a higher acoustic RI to the second layer of material 805 having a lower acoustic RI.

Hence, in some cases, the acoustic RI of the substrate 810 and the second layer of material 805 may be the same (e.g., same material) or substantially the same (e.g., materials having acoustic RI values that are within a threshold range of each other; e.g., glass substrate and titanium dioxide could have overlapping acoustic RIs).

In some implementations, the substrate 810 and the microlens structures 804 may be made of the same material, both of which may possess a higher acoustic RI than that of the second layer of material 805. For example, the substrate 810 and the microlens structures 804 may both be composed of glass, and they may both have a higher acoustic RI than that of the second layer of material 805 (e.g., high-index polymer).

Methodologies for fabricating and forming the different types of microlens structures, including microlens structures 404, 604, and 804, will be described in greater detail below.

Example Acoustic Sensor Stacks

The example stacks illustrated in the Figures are not necessarily depicted to scale. Although some portions of the example stacks may be depicted as having separate layers or elements, they may be in direct contact with one another with adjacent layer(s). In some cases, a layer or component may be attached (e.g., laminated via an adhesive) to another layer or component, formed on a layer, or abut against another layer.

As noted earlier, a "sensing element" may refer collectively to a transmitter element and a receiver element, such as an acoustic (e.g., ultrasonic) transmitter element and an acoustic (e.g., ultrasonic) receiver element. In some applications, the sensing element may be a module used with a fingerprint sensor or a part thereof, and the apparatus it is implemented in may be a flexible device, such as a foldable device or display. Hence, in some embodiments, the sensing element 902 may include an acoustic transmitter element and an acoustic receiver element, which may be examples of acoustic transmitter system 102 and acoustic receiver system 104, respectively.

Figure 9:
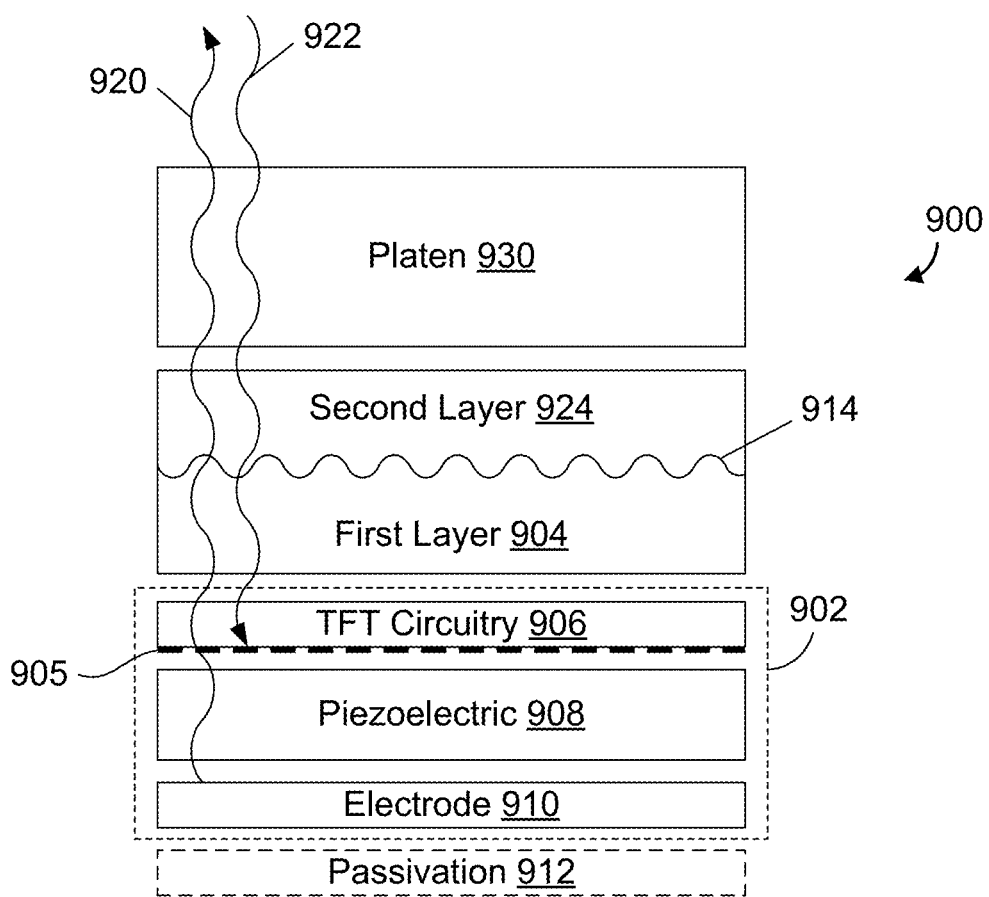
FIG. 9 shows a cross-sectional diagram of an example acoustic sensor stack usable with an apparatus according to some embodiments.

FIG. 9 shows a cross-sectional diagram of an example acoustic sensor stack 900 usable with an apparatus according to some embodiments. In some embodiments, the example acoustic sensor stack 900 may include a sensing element 902, a first layer of material 904, a second layer of material 924, and a platen 930. In some implementations, the sensing element 902 may include TFT circuitry 906, a piezoelectric layer 908, and an electrode layer 910. Some implementations of the example acoustic sensor stack 900 may also include a passivation layer 912.

In some embodiments, the sensing element 902 may be configured to transmit one or more acoustic signals 920 (e.g., ultrasonic waves). For example, the acoustic signals 920 may travel toward the platen 930 and/or a target object (e.g., a body part of a user, such as a finger placed against the platen 930). In some configurations, the one or more acoustic signals 920 may be generated by one or more portions of the piezoelectric layer 908 based on a transmit signal applied to the electrode layer 910.

The sensing element 902 may be further configured to receive and detect one or more returning acoustic signals 922 (e.g., reflected ultrasonic waves) from, e.g., the target object. In some implementations, thin-film transistors (TFTs) may be grown (e.g., through a fabrication process) on a substrate (such as the first layer of material 904 in some implementations, or separate from the first layer of material 904 in some implementations) and thereby form the TFT circuitry 906. TFT circuitry 906 may include one or more discrete (or pixelated) portions that form at least part of corresponding one or more acoustic receiver elements (represented by one or more receiver pixels 905, each of which forms part of the TFT circuitry 906), in conjunction with the piezoelectric layer 908. In some examples, the one or more pixelated portions may be one or more pixelated receiver electrodes having associated TFT circuitry of the TFT circuitry 906. Mechanical energy from the one or more returning acoustic signals 922 received at the piezoelectric layer 908 may be converted to electrical signals that are detected by the one or more receiver pixels 905 of the TFT circuitry 906 which are disposed between the boundary between the piezoelectric layer 908 and the TFT circuitry 906.

As noted elsewhere herein, one or more acoustic transmitter elements and one or more receiver elements may share and use the same piezoelectric layer 908.

In some embodiments, the first layer of material 904 may include or be disposed on a silicon-based substrate having TFT circuitry 906 grown thereon (also referred to herein as a Si-TFT substrate, further described above). Various forms of Si may be used, such as, but not limited to a-Si, poly-Si, HTPS, CG silicon. In some embodiments, the substrate may be a flexible substrate, e.g., a polymer substrate composed of polyimide. In some embodiments, the substrate may be a metal-based substrate, e.g., composed of MO or IGZO.

In some embodiments, the electrode layer 910 may be an example of an acoustic transmitter element or a portion thereof. In some implementations, the electrode layer 910 may include silver (Ag), e.g., in the form of conductive ink applied to the piezoelectric layer 908. In some implementations, the electrode layer 910 may include a thin metallic layer. In some cases, the thin metallic layer may be composed of copper (Cu), which would be pliable enough to allow the sensing element 902 conform to a curved surface. In implementations in which a thicker Ag is desired, Ag may be applied (e.g., printed) multiple times.

In some implementations, control circuitry and/or processing apparatus may drive transmit signals to the electrode layer 910, which may in turn cause generation and emission of acoustic waves from the electrode layer 910. In some examples, the control system may be configured to provide a voltage (e.g., 100-200 V, such as 120 V) to the electrode layer 910 (e.g., via a resonating circuit in passive components). The voltage may cause the electrode layer 910 to generate the one or more acoustic signals 920 at a frequency (e.g., 1-25 MHz, such as 7, 8, 10, 12 or 15 MHz). In general, higher frequency can provide a better resolution but sacrifice on transmission (higher decibel (dB) loss). A balance may be struck when selecting the frequency. Hence, the electrode layer 910 may be configured to cause emission of acoustic (e.g., ultrasonic) signals, and one or more portions the piezoelectric layer 908 may function as an acoustic transmitter element in conjunction with the electrode layer 910.

In some implementations, a passivation layer 912 may be included with the example acoustic sensor stack 900. In some cases, passivation may 912 include a protective coating (e.g., a non-conductive ink) applied to the sensing element 902 (or a portion thereof, such as the electrode layer 910) to make the sensor element or a surface thereof less susceptible to damage (e.g., chemical reactivity, corrosion) and increase electrical stability. The ink may also affect the resonance frequency of the resonating circuit. In some cases, passivation layer 912 may include a polymer layer, such as an acrylic or other die-attached film (DAF).

In some embodiments, the first layer of material 904 may be secured or adhered (e.g., directly laminated) to the platen 930 (or another component as mentioned above) via the second layer of material 924. In some implementations, the second layer of material 924 may include an adhesive material or an adhesive layer, for example, a pressure-sensitive adhesive (PSA). Some implementations of the example acoustic sensor stack 900 may include an adhesive layer separate from the second layer of material 924 between the second layer of material 924 and the platen 930 (or another component). In some cases, the separate adhesive layer may include a double-sided adhesive that includes a first layer of a PSA, a layer of copper (Cu), and a second layer of PSA. In some examples, each of the PSA layers may be about 6 µm thick, and the Cu layer may be about 18 µm thick.

In some embodiments, one or more microlens structures 914 may be present between the first layer of material 904 and the second layer of material 924. According to different implementations, the one or more microlens structures 914 may be convex microlenses (such as microlens structures 604 or 804) or concave microlenses (such as microlens structures 404). Therefore, depending on the implementation, the first layer of material 904 may be composed of a material that has a low acoustic RI or a high acoustic RI, and similarly, the second layer of material 924 may be composed of a material that has a low acoustic RI or a high acoustic RI, according to the discussions above. For example, in implementations in which the one or more microlens structures 914 are concave, the first layer of material 904 may include a material having a lower acoustic RI, and the second layer of material 924 may include a material that has a higher acoustic RI, similar to the sensor stack 400. As another example, in implementations in which the one or more microlens structures 914 are convex, the first layer of material 904 may include a material having a higher acoustic RI, and the second layer of material 924 may include a material that has a lower acoustic RI, similar to the sensor stack 600. In some examples, while the second layer of material 924 may include a material that has a lower acoustic RI where the one or more microlens structures 914 are convex, the one or more microlens structures 914 themselves may be composed of a material having a higher acoustic RI, similar to the sensor stack 800.

Figure 10:
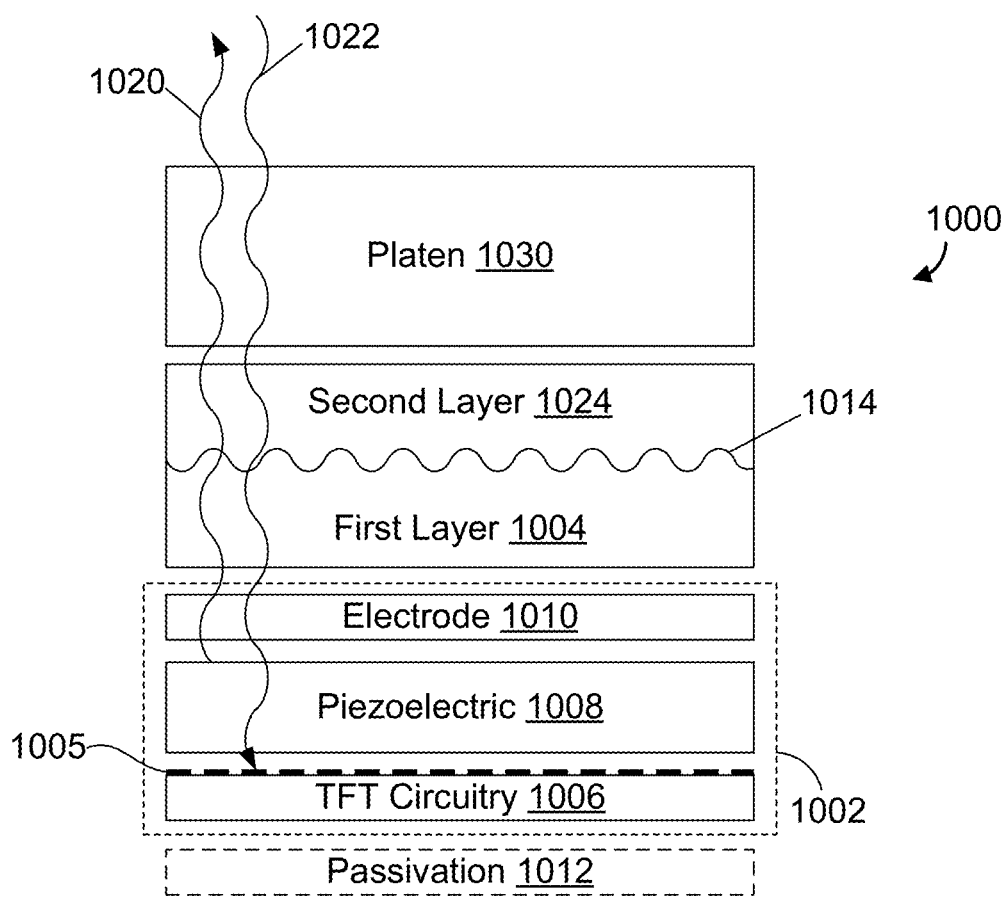
FIG. 10 shows a cross-sectional diagram of another example acoustic sensor stack usable with an apparatus according to some embodiments.

FIG. 10 shows a cross-sectional diagram of another example acoustic sensor stack 1000 usable with an apparatus according to some embodiments. In some embodiments, the example acoustic sensor stack 1000 may include a sensing element 1002, a first layer of material 1004, a second layer of material 1024, and a platen 1030. The sensing element 1002 may be an example of sensing element 902. The first layer of material 1004 may be an example of first layer of material 904. The second layer of material 1024 may be an example of second layer of material 924. The platen 1030 may be an example of platen 930. Some implementations of the example acoustic sensor stack 1000 may also include an adhesive layer between the second layer of material 1024 and the platen 1030 (or another component). Some implementations of the example acoustic sensor stack 1000 may also include a passivation layer 1012, which may be an example of passivation layer 912.

It can be seen that TFT circuitry 1006, a piezoelectric layer 1008, and an electrode layer 1010 of the sensing element 1002 may be reversed in order compared to the example acoustic sensor stack 900. The TFT circuitry 1006 may be an example of TFT circuitry 906, the piezoelectric layer 1008 may be an example of piezoelectric layer 908, and the electrode layer 1010 may be an example of electrode layer 910.

Example Fabrication Processes

Figure 11A:
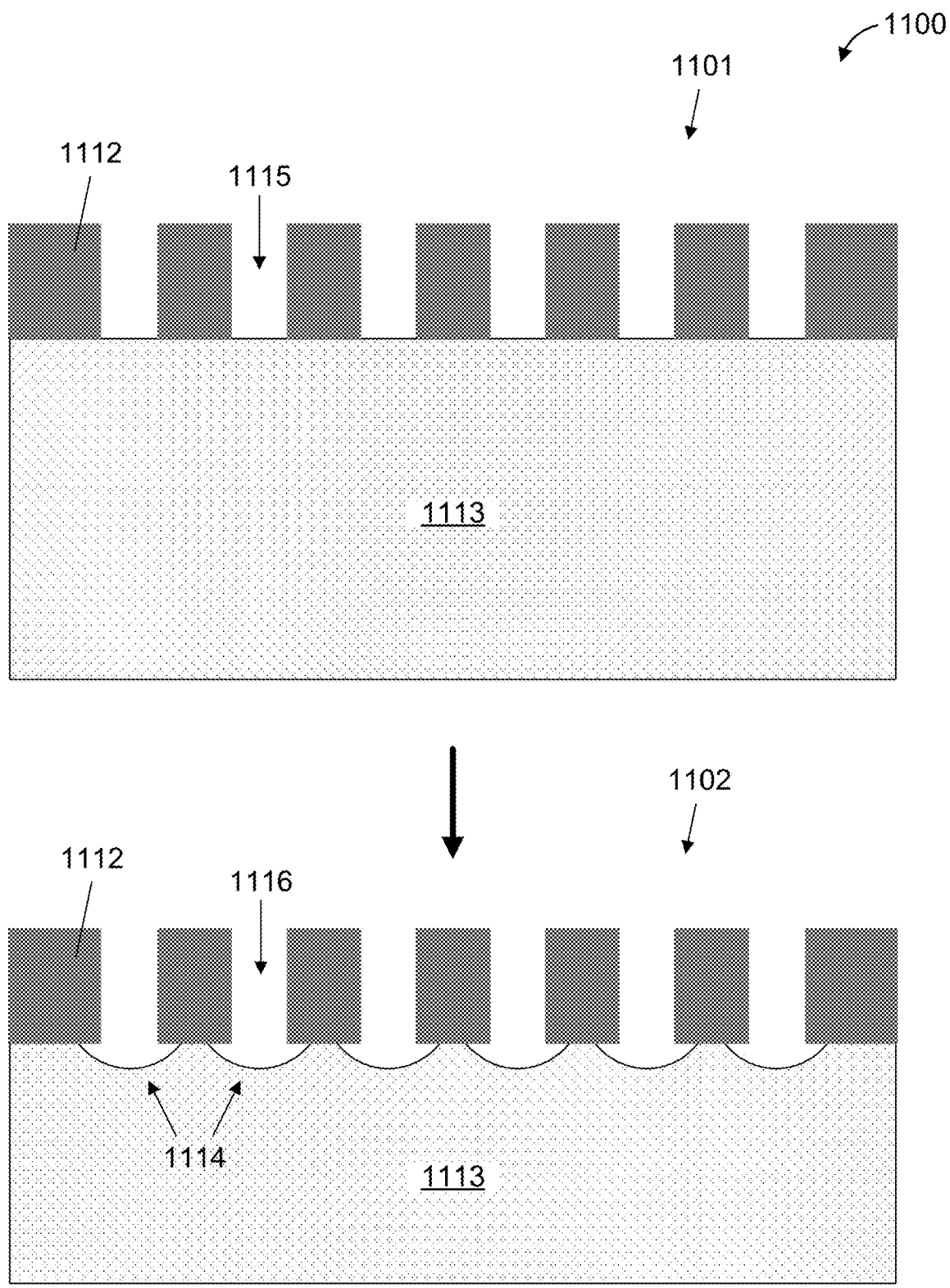
FIGS. 11A and 11B show an example sequence of forming concave microlens structures, according to some embodiments.
Figure 11B:
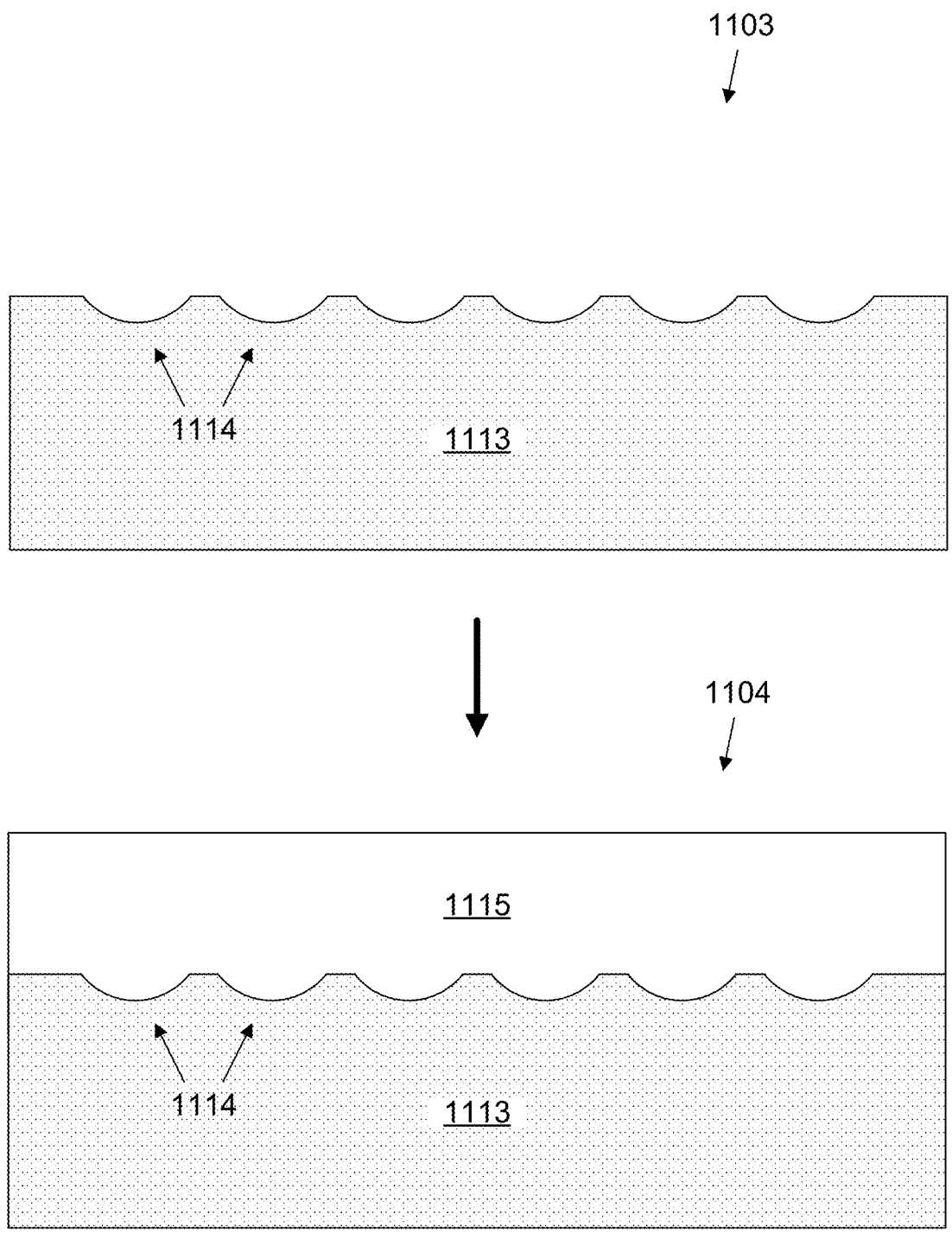

FIGS. 11A and 11B show an example sequence 1100 of forming concave microlens structures, according to some embodiments. In some embodiments, the example sequence 1100 may include an etching process. Example sequence 1100 may include example process portions 1101-1104.

At 1101, a plurality of etch masks 1112 may be deposited onto a substrate 1113. Example of etch masks 1112 may include a photoresist mask and/or an inorganic film. Some examples to depositing etch masks 1112 may include spin coating.

In some examples, a plasma process station in a plasma process chamber of a plasma enhanced chemical vapor deposition (PECVD) apparatus or system may be used to deposit the etch masks 1112 using gas precursor(s) for the etch mask. In other examples, other chemical vapor deposition (CVD) techniques could be used: low pressure chemical vapor deposition (LPCVD), atmospheric pressure chemical vapor deposition (APCVD), metal organic chemical vapor deposition (MOCVD), atomic layer deposition (ALD), plasma enhanced atomic layer deposition (PEALD), or through direct metal deposition (DMD), etc. based on the precursors chosen.

In some approaches, the substrate 1113 may include a first layer of material. In some embodiments, the first layer of material may be a material having a specified acoustic RI, such as that considered to be a low acoustic RI according to, for example, the sensor stack 400, which possesses concave microlens structures 404. In some approaches, the substrate 1113 may be the first layer of material. In some cases, the substrate 1113 may be disposed adjacent to a separate substrate (not shown). In some cases, the separate substrate may be a Si-TFT substrate.

As a result of depositing the etch masks 1112, one or more trenches 1116 may be formed between the etch masks 1112. The one or more trenches 1116 may each expose a portion of a surface of the substrate 1113. In some cases, there may be an equal (or substantially equal, e.g., within a range) distance between side walls of the etch masks 1112 to create one or more trenches 1116 having an equal (or substantially equal) width. Some or all etch masks 1112 may have an equal or substantially equal) width, although some of the etch masks 1112 may have different widths.

At 1102, an etch may be performed in the direction of the one or more trenches 1116. In some examples, a wet etch, e.g., using hydrogen fluoride (HF), may be performed. In some examples, a dry etch, e.g., using molecular oxygen ($O_2$), carbon tetrafluoride ($CF_4$), or argon (Ar), may be performed. The etch may be performed until a target depth is achieved. The etch result in formation of one or more concave structures 1114 at the bottom of respective ones of the one or more trenches 1116. In some implementations, concave structures 1114 may correspond to concave microlens structures, e.g., microlens structures 404.

Turning to FIG. 11B, at 1103, the etch masks 1112 may be removed from the substrate 1113. In some examples, the etch masks 1112 may be removed using NMP (n-methylpyrrolidone) as a wet solvent, or $O_2$ for ashing.

At 1104, a second layer of material 1115 may be disposed over the resulting substrate 1113 having the concave structures 1114. In some embodiments, the second layer of material 1115 may be a material having a high acoustic RI (e.g., according to the sensor stack 400). In some approaches, the second layer of material 1115 may be planarized to form a flat surface (as shown). In some examples, the resulting stack may correspond to the first layer of material 403, the microlens structures 404 at the surface of the first layer of material 403, and the second layer of material 405, as shown in FIG. 4.

Figure 12:
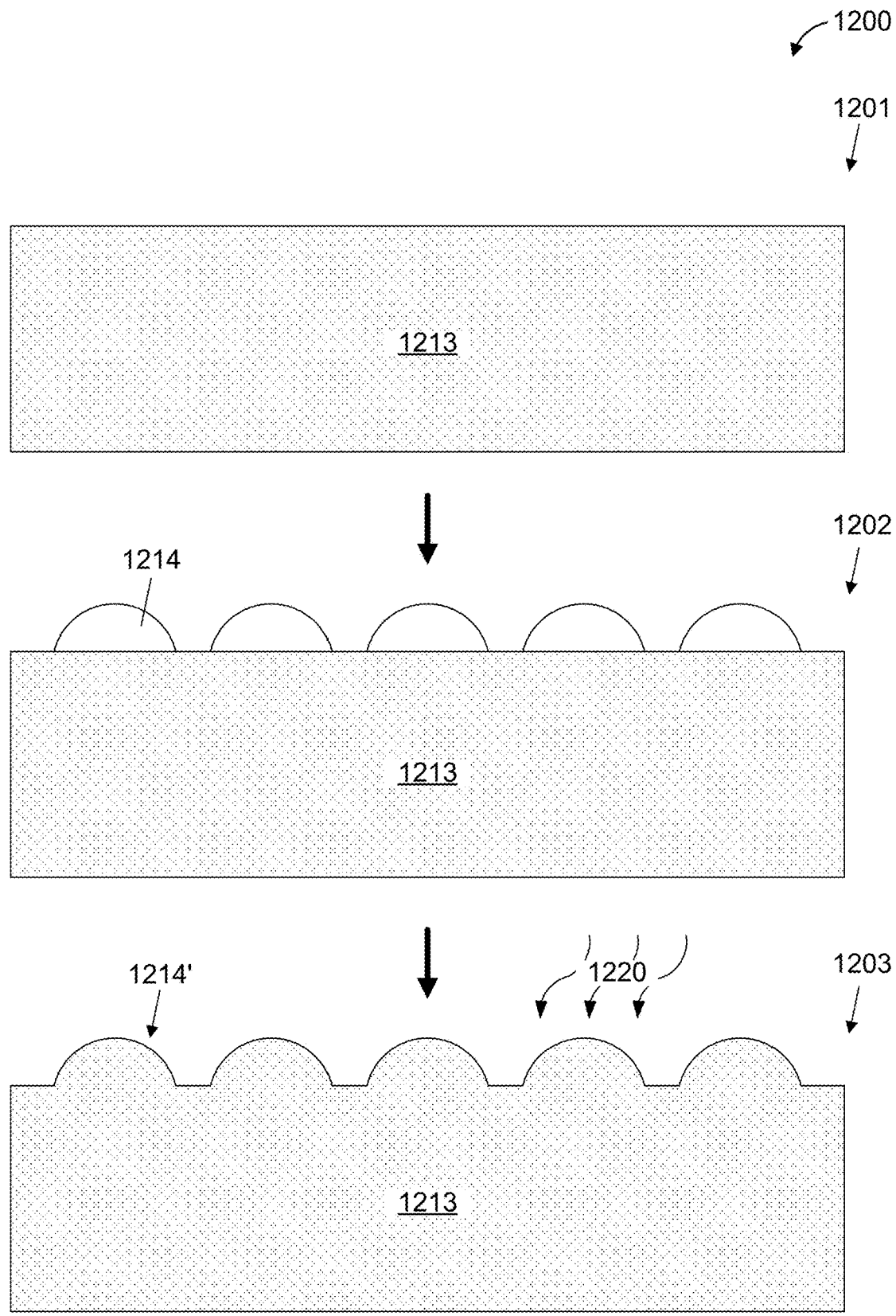
FIG. 12 shows an example sequence of forming convex microlens structures, according to some embodiments.

FIG. 12 shows an example sequence 1200 of forming convex microlens structures, according to some embodiments. In some embodiments, the example sequence 1200 may include a microdroplet jetting process. Example sequence 1200 may include example process portions 1201-1203.

At 1201, a substrate 1213 may be obtained. In some approaches, the substrate 1213 may include a first layer of material. In some embodiments, the first layer of material may be a material having a specified acoustic RI, such as a high acoustic RI according to, for example, the sensor stack 600, which possesses convex microlens structures 604. In some embodiments, the first layer of material may be an example of substrate 810 and may have a low or high acoustic RI. In some approaches, the substrate 1213 may itself be the first layer of material. In some cases, the substrate 1213 may be disposed adjacent to a separate substrate (not shown). In some cases, the separate substrate may be a Si-TFT substrate.

At 1202, one or more droplets 1214 may be placed on a surface of the substrate 1213. In some approaches, a jetting process may be used in conjunction with a nozzle. In some examples, the nozzle may be configured to deposit microdroplets of a polymer, such as a polymer having a high acoustic RI, e.g., acrylate, propionate, acetate, aerogel, or siloxane, as a few examples. In some cases, droplets 1214 may be equally (or substantially equally) spaced apart. In some cases, some of the droplets 1214 may be spaced apart from some others (e.g., in groups) by a different separation distance.

In some implementations, the jetted one or more droplets 1214 may be composed of the same material as the substrate 1213. For example, both may be the same material having a high acoustic RI. In some implementations, the jetted one or more droplets 1214 may be composed of a different material from the substrate 1213.

At 1203, the one or more droplets 1214 may undergo a curing process. In some approaches, ultraviolet (UV) radiation 1220 may be applied to the one or more droplets 1214. Example process conditions for curing via UV exposure may include 220 C for 1 hour. The curing process may result in one or more microlens structures 1214'. In some cases, the one or more microlens structures 1214' having a convex curvature may be incorporated as part of the substrate 1213 (similar to, e.g., microlens structures 604 of FIG. 6). In some cases, the one or more microlens structures 1214' may be separate structures from the substrate 1213 (similar to, e.g., microlens structures 804 of FIG. 8).

In subsequent processing, a second layer of material may be disposed over the substrate 1213 and the one or more microlens structures 1214'. Such second layer of material may be planarized to form a flat surface.

Figure 13:
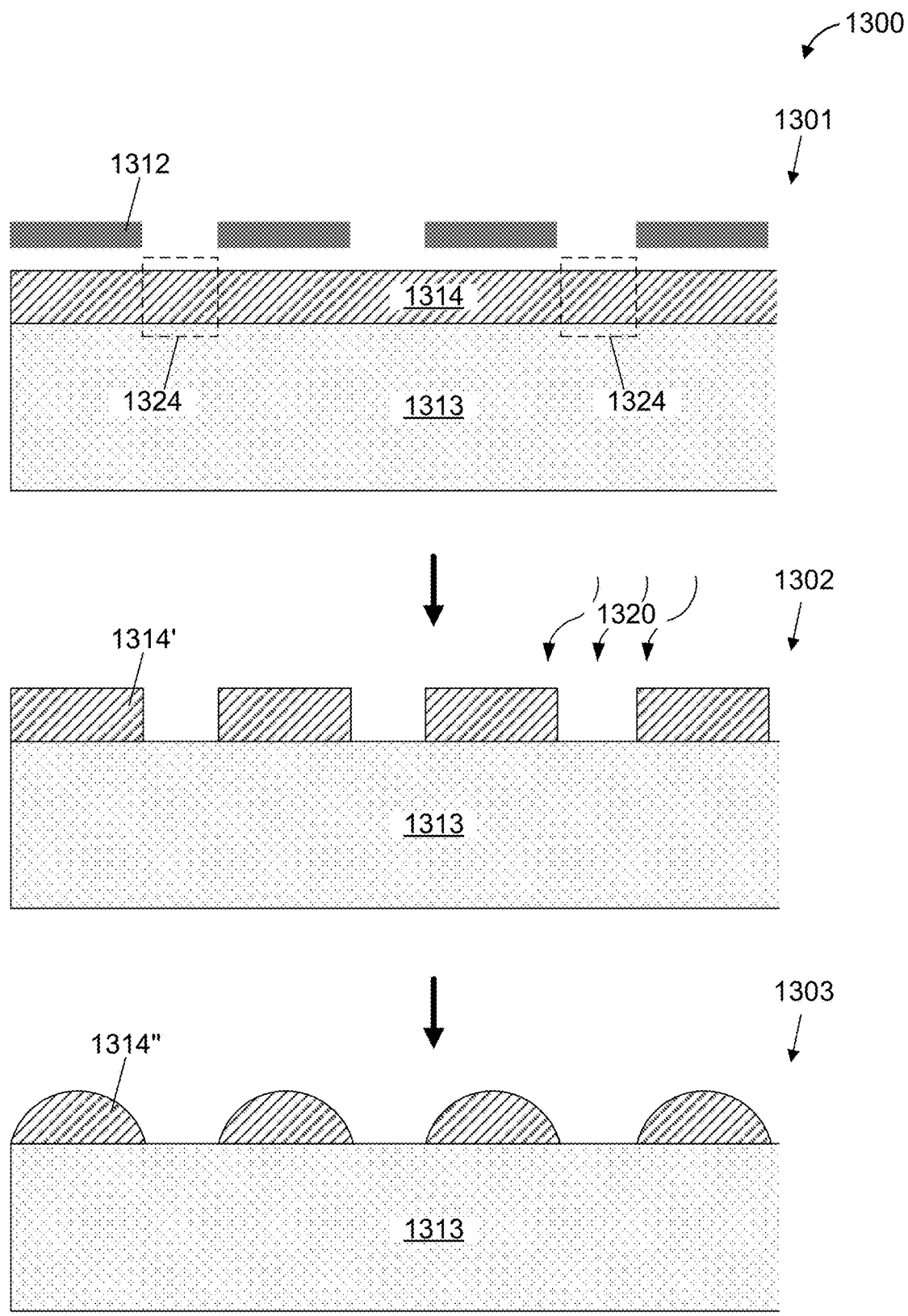
FIG. 13 shows another example sequence of forming convex microlens structures, according to some embodiments.

FIG. 13 shows another example sequence 1300 of forming convex microlens structures, according to some embodiments. In some embodiments, the example sequence 1300 may include a thermal reflow process. Example sequence 1300 may include example process portions 1301-1303.

At 1301, a substrate 1313 with a photoresist layer 1314 on the surface of the substrate 1313 may be obtained. In some approaches, the substrate 1313 may include a first layer of material. In some embodiments, the first layer of material may be a material having a specified acoustic RI, such as a high acoustic RI according to, for example, the sensor stack 600, which possesses convex microlens structures 604. In some embodiments, the first layer of material may be an example of substrate 810 and may have a low or high acoustic RI. In some approaches, the substrate 1313 may itself be the first layer of material. In some cases, the substrate 1313 may be disposed adjacent to a separate substrate (not shown). In some cases, the separate substrate may be a Si-TFT substrate.

In some approaches, the photoresist layer 1314 may be composed of SU-8 (structure of epoxies with 8 functional groups) photoresist, or a polymer such as polymethyl methacrylate (PMMA) or polydimethylsiloxane (PDMS). Photoresist materials may be sensitive to light and, when exposed to UV light, may change chemically and can become soluble.

In addition, a one or more masks 1312 may be disposed over the photoresist layer 1314. For example, the one or more masks 1312 may be composed of chromium (Cr).

In some approaches, at 1302, ultraviolet (UV) radiation 1320 may be applied to the photoresist layer 1314 while the one or more masks 1312 cover one or more portions thereof. One or more portions 1324 of the photoresist layer 1314 may turn soluble via reaction with the UV radiation 1320, and removed from the surface of the substrate 1313. In some examples, the UV radiation 1320 may be applied at a wavelength of 405 or 465 nanometers (nm) for gh-line lithography, or in some examples, 365 nm for i-line lithography. As a result of applying UV radiation 1320, one or more portions 1314' of the photoresist layer 1314 may remain.

At 1303, a thermal process may be applied to the remaining one or more portions 1314' of the photoresist layer 1314. In some examples, a rapid thermal process to 600 C may be applied. In some examples, the thermal process may include thermal cycling. As a result of the thermal process, one or more spherical structures 1314" may be formed out of the photoresist layer 1314. In some implementations, the one or more spherical structures 1314" may correspond to convex microlens structures, such as microlens structures 604 or microlens structures 804, and may possess an acoustic RI that is, in some examples, higher than that of the substrate 1313.

In subsequent processing, a second layer of material may be disposed over the substrate 1313 and the one or more spherical structures 1314". Such second layer of material may be planarized to form a flat surface.

Figure 14:
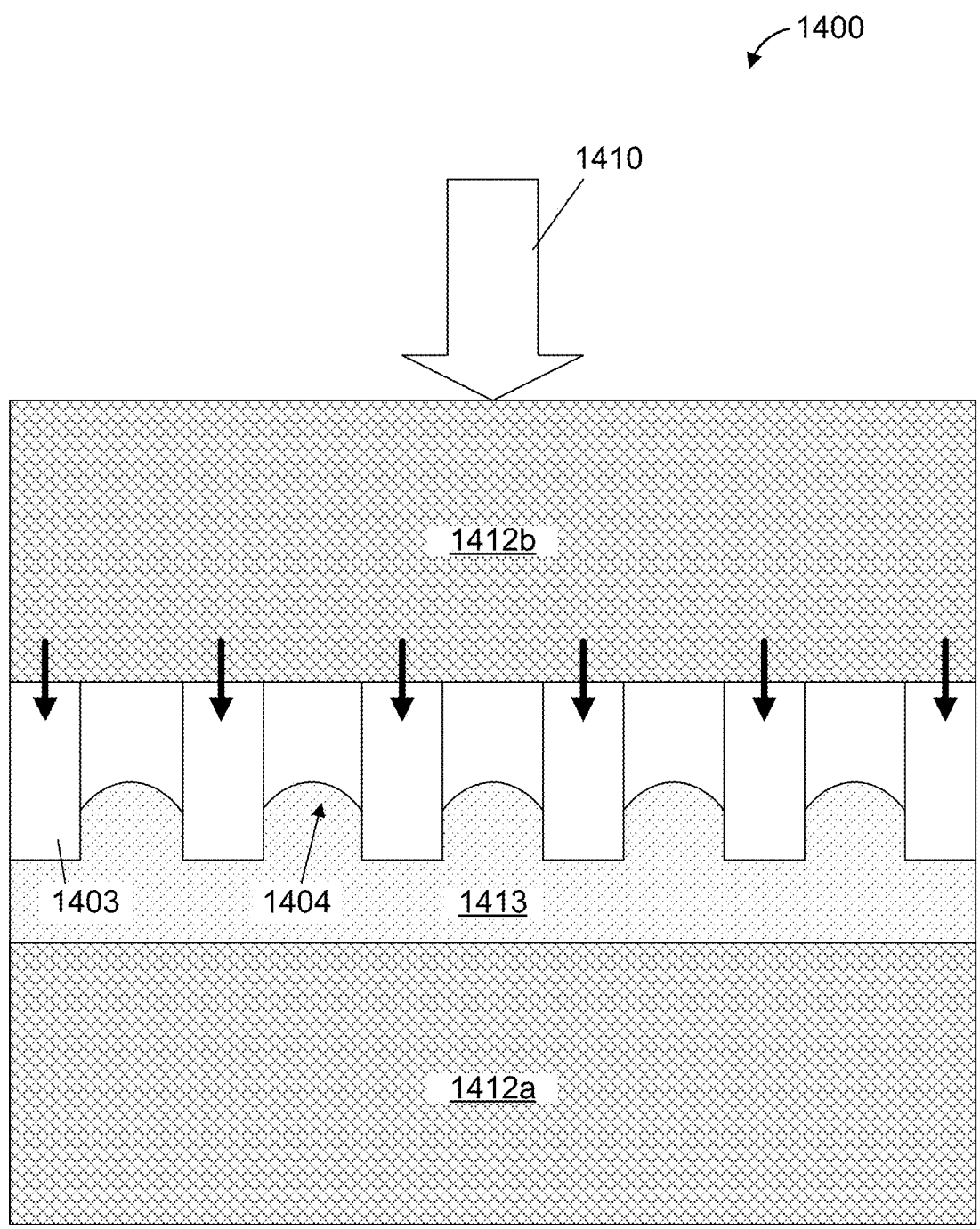
FIG. 14 shows another example sequence of forming convex microlens structures, according to some embodiments.

FIG. 14 shows an example method 1400 of forming convex microlens structures, according to some embodiments. In some embodiments, the example method 1400 may include a microplastic embossing process.

In some approaches, a plurality of mold inserts 1403 may be placed on a substrate 1413. In some implementations, the substrate 1413 may include a first layer of material. In some embodiments, the first layer of material may be a material having a specified acoustic RI, such as a high acoustic RI according to, for example, the sensor stack 600, which possesses convex microlens structures 604. In some approaches, the substrate 1413 may itself be the first layer of material. In some cases, the substrate 1413 may be disposed adjacent to a separate substrate (not shown). For example, the separate substrate may be an example of substrate 810 of FIG. 8. In some cases, the separate substrate may be a Si-TFT substrate.

In some approaches, a first heating element 1412a may be disposed under the substrate 1413, and a second heating element 1412b may be disposed over the mold inserts 1403. In some examples, each of the first heating element 1412a and the second heating element 1412b may be a heating plate, which may be composed of a metallic, ceramic, or organic material.

In some approaches, an external pressure 1410 may be applied to the first heating element 1412a. For example, a mechanical press may be used to apply a force of about 50-300 grams. The pressure 1410 may thereby be transferred to the mold inserts 1403 and portions of the substrate 1413. The pressure 1410 and the elevated temperature from, e.g., the second heating element 1412b (and/or the first heating element 1412a) may result in physical deformation of the substrate 1413 at one or more locations. The physical deformations may result in formation of one or more convex structures 1404, which may correspond to the convex microlens structures, such as microlens structures 604, and may possess an acoustic RI that is, in some examples, high.

In subsequent processing, a second layer of material may be disposed over the substrate 1413 and the one or more convex structures 1404. In some implementations, such second layer of material may have an acoustic RI that is lower than that of the one or more convex structures 1404. Such second layer of material may be planarized to form a flat surface.

Figure 15:
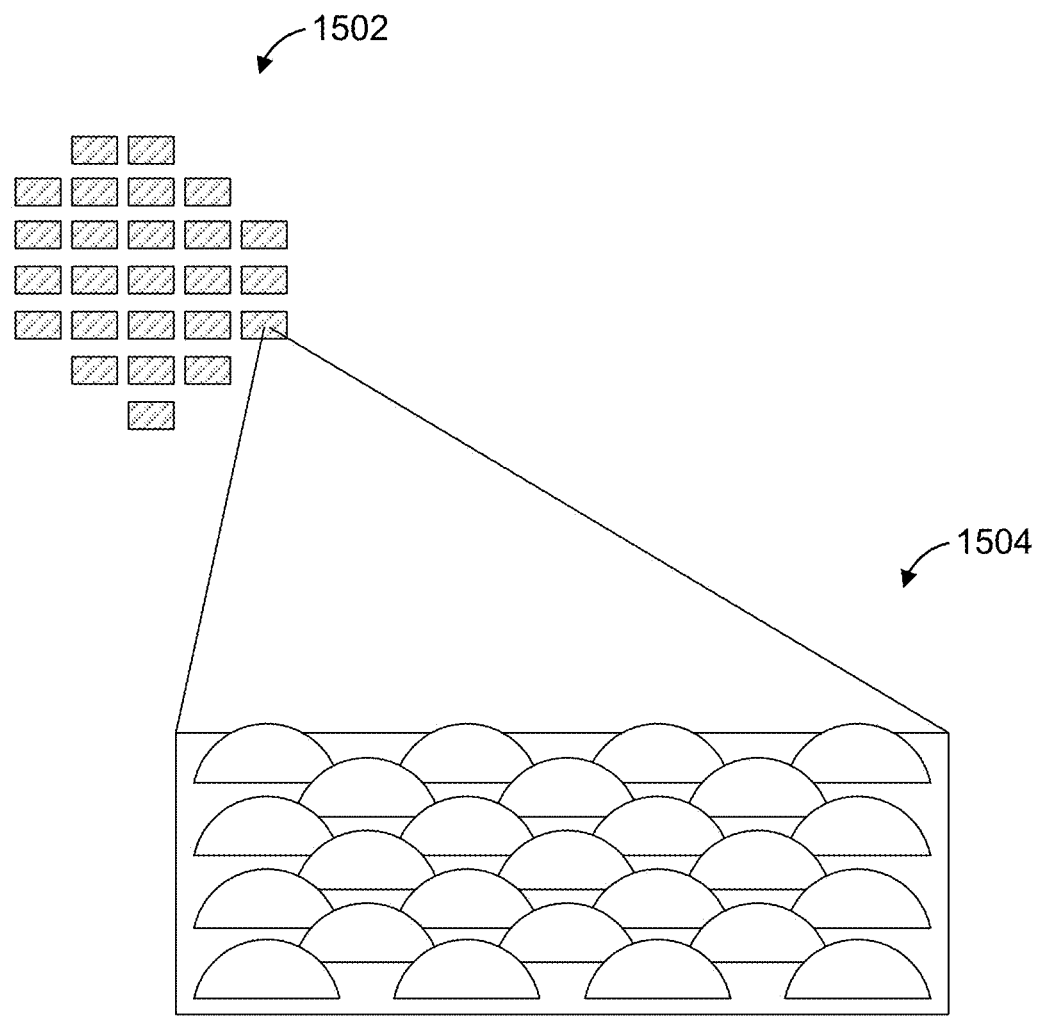
FIG. 15 depicts an array of sensor elements and an array of microlens structures of a sensor element, according to some embodiments.

In some examples, as shown in FIG. 15, an array of sensor elements 1502 may be fabricated on a single wafer or substrate. In some approaches, singulation cutting may be used to separate the array of sensor elements 1502 into individual sensor elements (e.g., chips). Each sensor element 1502 may include an array of microlens structures 1504 formed using at least a fabrication method described above. As can be seen, the array of microlens structures 1504 may be spaced apart uniformly. However, in some embodiments, microlens structures 1504 may be spaced apart unevenly. For instance, some microlens structures 1504 may be formed closer together in groups, and/or some microlens structures 1504 may be spaced farther apart than others.

Example Methods

Figure 16:
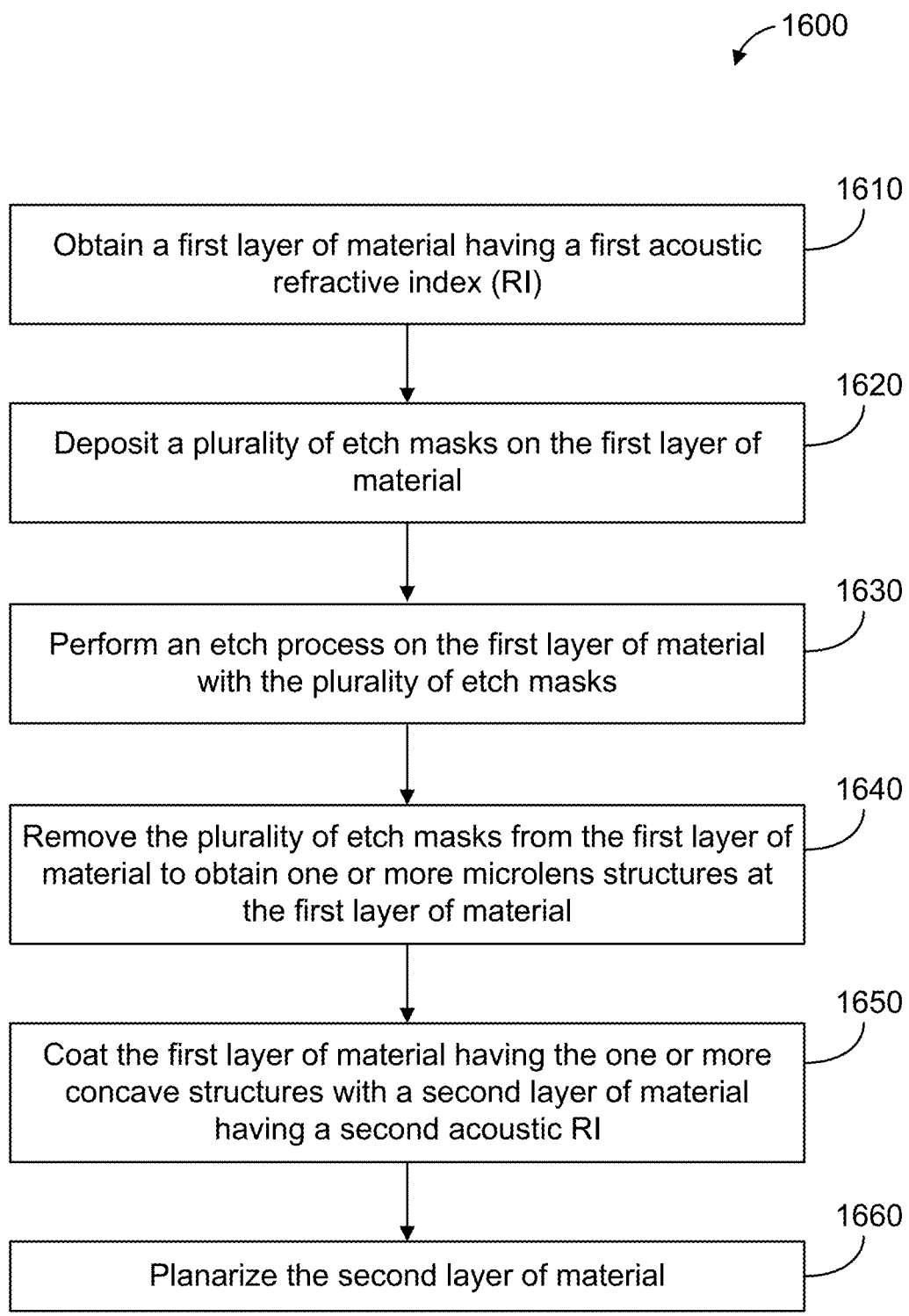
FIG. 16 is a flow diagram of an example method of forming a sensor stack having microlens structures (e.g., concave microlens structures between first and second layers of material), according to some embodiments.

FIG. 16 is a flow diagram of an example method 1600 of forming a sensor stack having microlens structures, according to some disclosed embodiments. Structure for performing the functionality illustrated in one or more of the blocks shown in FIG. 16 may be performed by hardware and/or software components, such as a control system, of an apparatus or system. Examples of such apparatus or system may include a semiconductor fabrication apparatus or system, or one or more components thereof, e.g., a process chamber or a process station, precursor reactant gas line(s) and inlet(s), radio frequency (RF) power source (e.g., to generate plasma). Such apparatus or system may be communicatively coupled with the control system (including one or more processors), a memory, and/or a computer-readable apparatus including a storage medium storing computer-readable and/or computer-executable instructions that are configured to, when executed by the control system, cause the control system, the one or more processors, or the apparatus or system to perform operations represented by blocks below.

The method outlined in FIG. 16 may include more or fewer blocks than indicated. Moreover, the blocks of methods disclosed herein are not necessarily performed in the order indicated. In some instances, one or more of the blocks shown in FIG. 16 may be performed concurrently.

At block 1610, the method 1600 may include obtaining a first layer of material having a first acoustic refractive index (RI). In some embodiments, the first acoustic RI may be a low acoustic RI. Thus, the first layer of material may include a material having a low acoustic RI. A few examples of materials considered to have a low acoustic RI may include diamond, glass, fused silica, titanium dioxide, silicon carbide, and high-index polymers. Additional examples are listed in Table 1 above. In some embodiments, the first layer of material may be a substrate. In some embodiments, the first layer of material may be disposed on a separate substrate. In some cases, the separate substrate may be a Si-TFT substrate.

At block 1620, the method 1600 may include depositing a plurality of etch masks on the first layer of material. As a result, one or more trenches may be formed, each of which may expose a portion of the first layer of material (or substrate). An example of an etch mask may be etch mask 1112. In some cases, block 1620 may correspond to example process portion 1101.

At block 1630, the method 1600 may include performing an etch process on the first layer of material with the plurality of etch masks. More specifically, the portion of the first layer of material (or substrate) may be exposed to etchants, such as HF, $O_2$, $CF_4$, Ar. The etch process may result in formation of one or more concave structures on the first layer of material (or substrate). As a result, a first layer of material (or substrate) having the one or more concave structures may be obtained. In some cases, block 1630 may correspond to example process portion 1102.

At block 1640, the method 1600 may include removing the plurality of etch masks from the first layer of material to obtain one or more microlens structures at the first layer of material. The concave structures at the first layer of material may be an example of microlens structures, such as microlens structures 404. In some cases, block 1640 may correspond to example process portion 1103.

At block 1650, the method 1600 may include coating the first layer of material (or substrate) having the one or more concave structures with a second layer of material having a second acoustic RI. In some embodiments, the second acoustic RI may be a high acoustic RI. Thus, the second layer of material may include a material having a high acoustic RI. A few examples of materials considered to have a high acoustic RI may include acrylate, propionate, acetate, aerogel, and siloxane. Additional examples are listed in Table 1 above. Thus, the second layer of material may have a higher acoustic RI than that of the first layer of material.

In some implementations, the second layer of material may be planarized, at block 1660. Planarization may form a flat surface on the second layer of material.

In some cases, the example method 1600 may result in a sensor stack 400 or a portion thereof, which may include a first layer of material, a second layer of material, and one or more concave microlens structures at a surface of the first layer of material and disposed between the first and second layers of material. In a downstream process, the resulting structure may be used with other parts of a sensor stack (such as a piezoelectric layer, a platen, a TFT layer, etc.), which may then be advantageously implemented in a device (e.g., a flexible device with a foldable display) to be used for applications such as enhanced fingerprint sensing (e.g., with a focused pressure wave amplifying ultrasonic waves), authentication of a user based on the fingerprint sensing, etc.

Figure 17:
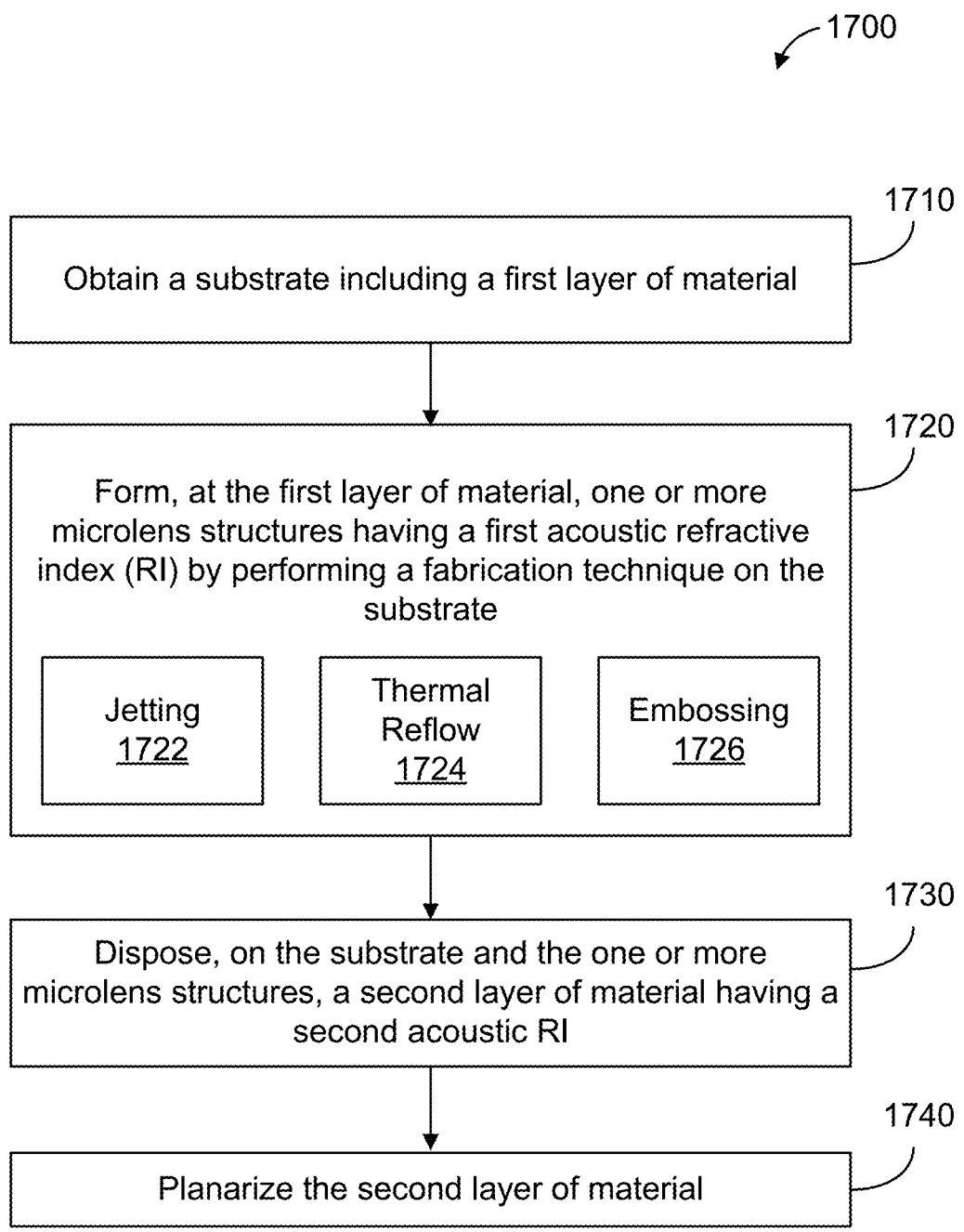
FIG. 17 is a flow diagram of another example method of forming a sensor stack having microlens structures (e.g., convex microlens structures between first and second layers of material), according to some embodiments.

FIG. 17 is a flow diagram of another example method 1700 of forming a sensor stack having microlens structures, according to some disclosed embodiments. Structure for performing the functionality illustrated in one or more of the blocks shown in FIG. 17 may be performed by hardware and/or software components, such as a control system, of an apparatus or system. Examples of such apparatus or system may include a semiconductor fabrication apparatus or system, or one or more components thereof, e.g., a process chamber or a process station, precursor reactant gas line(s) and inlet(s), radio frequency (RF) power source (e.g., to generate plasma). Such apparatus or system may be communicatively coupled with the control system (including one or more processors), a memory, and/or a computer-readable apparatus including a storage medium storing computer-readable and/or computer-executable instructions that are configured to, when executed by the control system, cause the control system, the one or more processors, or the apparatus or system to perform operations represented by blocks below.

The method outlined in FIG. 17 may include more or fewer blocks than indicated. Moreover, the blocks of methods disclosed herein are not necessarily performed in the order indicated. In some instances, one or more of the blocks shown in FIG. 17 may be performed concurrently.

At block 1710, the method 1700 may include obtaining a substrate including a first layer of material. In some embodiments, the substrate may be a silicon-based substrate with TFTs formed thereon. In some embodiments, the substrate may include glass or a polymer. According to different implementations, the first layer of material may be separate layer to the substrate, or may be the substrate itself.

In some embodiments, the substrate may include a first layer of material having, in some cases, a low acoustic refractive index (RI). Examples of materials having low acoustic RI may include acrylate, propionate, acetate, aerogel, and siloxane. Additional examples are listed in Table 1. In some cases, the substrate including the first layer of material may have a high acoustic RI. As described with respect to sensor stack 800, the substrate may possess an acoustic RI that is low or high, as long as the microlens structures have an appropriate acoustic RI (as described below).

At block 1720, the method 1700 may include forming, at the first layer of material, one or more microlens structures having a first acoustic refractive index (RI) by performing a fabrication technique on the substrate.

In some approaches, the fabrication technique may include jetting 1722. Jetting 1722 may be an example of the microdroplet jetting process described with respect to example sequence 1200. In some approaches, the fabrication technique may include thermal reflow 1724. Thermal reflow 1724 may be an example of the thermal reflow process described with respect to example sequence 1300. In some approaches, the fabrication technique may include embossing 1726. Embossing 1726 may be an example of the microplastic embossing process described with respect to example method 1400.

In some embodiments, the fabrication technique may result in one or more convex microlens structures on the first layer of material. As a result, a first layer of material (or substrate) having the one or more convex structures may be obtained. Moreover, in some embodiments, the first acoustic RI of the one or more convex microlens structures may be a low acoustic RI.

At block 1730, the method 1700 may include disposing, on the first layer of material and the one or more microlens structures, a second layer of material having a second acoustic RI. In some embodiments, the second acoustic RI may be a high acoustic RI. Thus, the second layer of material may include a material having a high acoustic RI. A few examples of materials considered to have a high acoustic RI and may be used may include glass, fused silica, titanium dioxide, stainless steel. Additional examples are listed in Table 1 above.

In some implementations, at block 1740, subsequent to the disposing of the second layer of material, a planarization process may be performed on the second layer of material to flatten a surface of the second layer of material.

In some cases, the example method 1700 may result in a sensor stack 600 or 800 or a portion thereof, which may include a first layer of material, a second layer of material, and one or more convex microlens structures at a surface of the first layer of material and disposed between the first and second layers of material. In a downstream process, the resulting structure may be used with other parts of a sensor stack (such as a piezoelectric layer, a platen, a TFT layer, etc.), which may then be advantageously implemented in a device (e.g., a flexible device with a foldable display) to be used for applications such as enhanced fingerprint sensing (e.g., with a focused pressure wave amplifying ultrasonic waves), authentication of a user based on the fingerprint sensing, etc.

Figure 18:
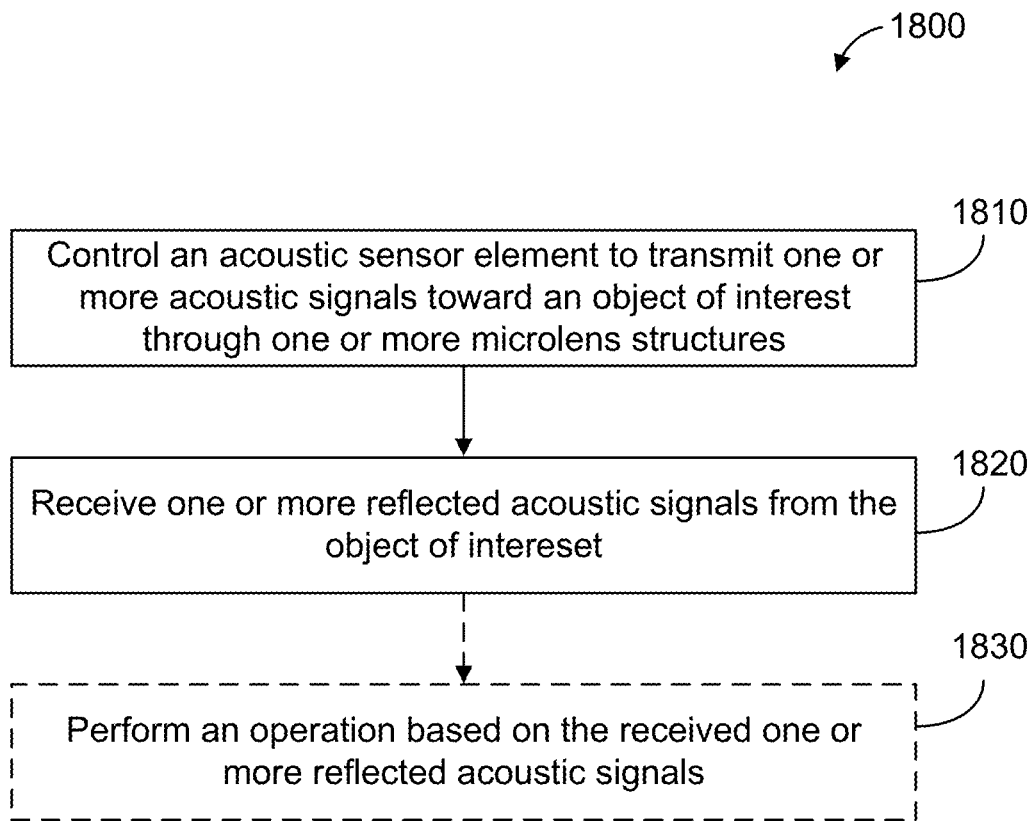
FIG. 18 is a flow diagram of an example method operating a sensor system of a user device, according to some embodiments.

FIG. 18 is a flow diagram of a method 1800 of operating a sensor system of a user device, according to some disclosed embodiments. Structure for performing the functionality illustrated in one or more of the blocks shown in FIG. 18 may be performed by hardware and/or software components of a computerized apparatus or system, which may be implemented as a flexible (e.g., foldable) device or a wearable device in some embodiments. Components of such apparatus or system may include, for example, an acoustic transmitter system, an acoustic receiver system, a control system (including one or more processors), a memory, and/or a computer-readable apparatus including a storage medium storing computer-readable and/or computer-executable instructions that are configured to, when executed by the control system, cause the control system, the one or more processors, or the apparatus or system to perform operations represented by blocks below. Example components of the apparatus or system are illustrated in, e.g., FIGS. 1-3, which are described in more detail above.

The blocks of FIG. 18 may, for example, be performed by the apparatus 100 or by a similar apparatus, or a component thereof (e.g., a control system). As with other methods disclosed herein, the method outlined in FIG. 18 may include more or fewer blocks than indicated. Moreover, the blocks of methods disclosed herein are not necessarily performed in the order indicated. In some instances, one or more of the blocks shown in FIG. 18 may be performed concurrently.

At block 1810, the method 1800 may include controlling (e.g., by a control system, such as control system 106) an acoustic sensor element to transmit one or more acoustic signals toward an object of interest (e.g., a finger of a user) through one or more microlens structures. In some cases, one or more acoustic signals may be ultrasonic signals transmitted by one or more acoustic transmitter elements. In some implementations, the acoustic sensor element may be used with a device. For example, the device may be a flexible device, such as a foldable device.

In some embodiments, the one or more microlens structures may be part of a first layer of material having a first acoustic refractive index (RI). The one or more microlens structures may have a concave shape or a convex shape. Acoustic signals may pass through the one or more microlens structures into a second layer of material having a second acoustic RI. In some embodiments, there may be a difference between the first and second acoustic RI values, where the difference in RI values meets or exceeds a difference threshold or range. As long as the acoustic RI values are different and appropriate for the concavity or convexity of the one or more microlens structures, as described throughout this disclosure, various materials may be selected to implement relatively higher or lower acoustic RI of the first and second layers of material. Table 1 lists example materials and their acoustic RI values, which may be used for the selection of materials according to their acoustic RI values.

Means for performing functionality at block 1810 may include acoustic transmitter system 102, control system 106, and/or other components of the apparatus as shown in FIG. 1.

At block 1820, the method 1800 may include receiving one or more reflected acoustic signals from the object of interest. In some cases, the one or more reflected acoustic signals may be ultrasonic signals detected and received by one or more receiver elements, such as one or more receiver pixels, and the reflected acoustic signals may be representative of acoustic data, e.g., fingerprint data, from the imaging portion.

Means for performing functionality at block 1820 may include acoustic receiver system 104 and/or other components of the apparatus as shown in FIG. 1

At block 1830, the method 1800 may include performing an operation based on the received one or more reflected acoustic signals. In some examples, acoustic data may be used to identify the object of interest or a portion thereof, generate imaging data (e.g., fingerprint imaging data) and/or an image based on the imaging data (e.g., fingerprint image), change an operative state of a device using the acoustic data, perform an operation with the device (initialize an application, display data, etc.), etc., or a combination thereof.

Means for performing functionality at block 1830 may include the control system 106 and/or other components of the apparatus as shown in FIG. 1.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Various modifications to the implementations described in this disclosure may be readily apparent to those skilled in the art, and the generic principles defined herein may be applied to other implementations without departing from the spirit or scope of this disclosure. Thus, the following claims are not intended to be limited to the implementations shown herein, but are to be accorded the widest scope consistent with this disclosure, the principles and the novel features disclosed herein.

Additionally, certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. Moreover, various ones of the described and illustrated operations can itself include and collectively refer to a number of sub-operations. For example, each of the operations described above can itself involve the execution of a process or algorithm. Furthermore, various ones of the described and illustrated operations can be combined or performed in parallel in some implementations. Similarly, the separation of various system components in the implementations described above should not be understood as requiring such separation in all implementations. As such, other implementations are within the scope of the following claims. In some cases, the actions recited in the claims can be performed in a different order and still achieve desirable results.

Implementation examples are described in the following numbered clauses:

Clause 1: An apparatus comprising: an acoustic sensing element; a display stack; a first layer of material having a first acoustic refractive index and one or more microlens structures disposed at a first surface of the first layer of material; and a second layer of material disposed on the first layer of material and the one or more microlens structures, the second layer of material having a second acoustic refractive index that is different from the first acoustic refractive index; wherein the first layer of material and the second layer of material are disposed between the acoustic sensing element and the display stack such that the first layer of material is disposed adjacent to the acoustic sensing element, the second layer of material is disposed adjacent to the display stack, and the one or more microlens structures are configured to form a focused pressure wave from one or more acoustic signals emitted by the acoustic sensing element.

Clause 2: The apparatus of clause 1, wherein the one or more microlens structures comprise one or more convex microlens structures that protrude into the second layer of material.

Clause 3: The apparatus of clause 2, wherein the first acoustic refractive index of the first layer of material is higher than the second acoustic refractive index of the second layer of material.

Clause 4: The apparatus of clause 3, wherein the first layer of material comprises acrylate, propionate, acetate, aerogel, or siloxane.

Clause 5: The apparatus of clause 3, wherein the second layer of material comprises glass, fused silica, titanium dioxide, or stainless steel.

Clause 6: The apparatus of clause 2, wherein the one or more convex microlens structures each comprises a width of between about 40 and 80 µm, and a pitch of about 50 to 300 µm.

Clause 7: The apparatus of clause 1, further comprising a substrate, the substrate comprising a silicon-based substrate disposed adjacent to the first layer of material.

Clause 8: The apparatus of clause 1, wherein the one or more microlens structures comprise one or more concave microlens structures into which the second layer of material protrudes.

Clause 9: The apparatus of clause 8, wherein the first acoustic refractive index of the first layer of material is lower than the second acoustic refractive index of the second layer of material.

Clause 10: The apparatus of clause 9, wherein the first layer of material comprises glass.

Clause 11: The apparatus of clause 9, wherein the first layer of material comprises glass, fused silica, titanium dioxide, or stainless steel.

Clause 12: The apparatus of clause 1, wherein the first acoustic refractive index of the first layer of material is lower than the second acoustic refractive index of the second layer of material.

Clause 13: The apparatus of clause 1, wherein the first acoustic refractive index of the first layer of material is higher than the second acoustic refractive index of the second layer of material.

Clause 14: The apparatus of clause 1, wherein the first layer of material is doped to increase a speed of propagation of the one or more acoustic signals through the first layer of material and decrease the first acoustic refractive index, the second layer of material is modified to decrease the speed of propagation of the one or more acoustic signals through the second layer of material and increase the second acoustic refractive index and, or a combination thereof.

Clause 15: An apparatus comprising: a first layer of material having a first acoustic refractive index and one or more microlens structures at a surface of the first layer of material; and a second layer of material abutting the first layer of material and the one or more microlens structures, the second layer of material having a second acoustic refractive index that is different from the first acoustic refractive index.

Clause 16: The apparatus of clause 15, wherein: the first acoustic refractive index is higher than the second acoustic refractive index; and the one or more microlens structures at the surface of the first layer of material comprise convex structures that protrude into the second layer of material.

Clause 17: The apparatus of clause 16, wherein: the first layer of material comprises acrylate, propionate, acetate, aerogel, or siloxane; and the second layer of material comprises glass, fused silica, titanium dioxide, or stainless steel.

Clause 18: The apparatus of clause 15, wherein: the first acoustic refractive index is lower than the second acoustic refractive index; and the one or more microlens structures at the surface of the first layer of material comprise concave structures into which the second layer of material protrudes.

Clause 19: The apparatus of clause 18, wherein: the first layer of material comprises glass, fused silica, titanium dioxide, or stainless steel; and the second layer of material comprises acrylate, propionate, acetate, aerogel, or siloxane.

Clause 20: An apparatus comprising: an acoustic transmitter element configured to cause emission of acoustic signals; a first layer of material and one or more microlens structures having a first acoustic refractive index; and a second layer of material having a second acoustic refractive index that is different from the first acoustic refractive index; wherein the first layer of material and the second layer of material are configured to cause the emitted acoustic signals to propagate through the one or more microlens structures and thereby constructively form, at a location different from a location of the acoustic transmitter element, one or more acoustic signals having a higher pressure than the emitted acoustic signals.

What is claimed:

1. An apparatus comprising:
   an acoustic transmitter element configured to emit acoustic signals;
   a display stack;
   a first layer of material having a first acoustic refractive index and one or more microlens structures disposed at a first surface of the first layer of material; and
   a second layer of material disposed on the first layer of material and the one or more microlens structures, the second layer of material having a second acoustic refractive index that is different from the first acoustic refractive index;
   wherein the first layer of material and the second layer of material are disposed between the acoustic transmitter element configured to emit acoustic signals and the display stack such that the first layer of material is disposed adjacent to the acoustic transmitter element configured to emit acoustic signals, the second layer of material is disposed adjacent to the display stack, and the one or more microlens structures are configured to form a focused pressure wave from one or more acoustic signals emitted by the acoustic transmitter element configured to emit acoustic signals.

2. The apparatus of claim 1, wherein the one or more microlens structures comprise one or more convex microlens structures that protrude into the second layer of material.

3. The apparatus of claim 2, wherein the first acoustic refractive index of the first layer of material is higher than the second acoustic refractive index of the second layer of material.

4. The apparatus of claim 3, wherein the first layer of material comprises acrylate, propionate, acetate, aerogel, or siloxane.

5. The apparatus of claim 3, wherein the second layer of material comprises glass, fused silica, titanium dioxide, or stainless steel.

6. The apparatus of claim 2, wherein the one or more convex microlens structures each comprises a width of between about 40 and 80 μm, and a pitch of about 50 to 300 μm.

7. The apparatus of claim 1, further comprising a substrate, the substrate comprising a silicon-based substrate disposed adjacent to the first layer of material.

8. The apparatus of claim 1, wherein the one or more microlens structures comprise one or more concave microlens structures into which the second layer of material protrudes.

9. The apparatus of claim 8, wherein the first acoustic refractive index of the first layer of material is lower than the second acoustic refractive index of the second layer of material.

10. The apparatus of claim 9, wherein the first layer of material comprises glass.

11. The apparatus of claim 9, wherein the first layer of material comprises glass, fused silica, titanium dioxide, or stainless steel.

12. The apparatus of claim 1, wherein the first acoustic refractive index of the first layer of material is lower than the second acoustic refractive index of the second layer of material.

13. The apparatus of claim 1, wherein the first acoustic refractive index of the first layer of material is higher than the second acoustic refractive index of the second layer of material.

14. The apparatus of claim 1, wherein the first layer of material is doped to increase a speed of propagation of the one or more acoustic signals through the first layer of material and decrease the first acoustic refractive index, the second layer of material is modified to decrease the speed of propagation of the one or more acoustic signals through the second layer of material and increase the second acoustic refractive index and, or a combination thereof.

15. An apparatus comprising:
   a first layer of material having a first acoustic refractive index and one or more microlens structures at a surface of the first layer of material; and
   a second layer of material abutting the first layer of material and the one or more microlens structures, the second layer of material having a second acoustic refractive index that is different from the first acoustic refractive index;
   wherein the first acoustic refractive index is higher than the second acoustic refractive index; and
   the one or more microlens structures at the surface of the first layer of material comprise convex structures that protrude into the second layer of material.

16. The apparatus of claim 15, wherein:
   the first layer of material comprises acrylate, propionate, acetate, aerogel, or siloxane; and the second layer of material comprises glass, fused silica, titanium dioxide, or stainless steel.

17. An apparatus comprising:
an acoustic transmitter element configured to cause emission of acoustic signals;
a first layer of material and one or more microlens structures having a first acoustic refractive index; and
a second layer of material having a second acoustic refractive index that is different from the first acoustic refractive index;
wherein the first layer of material and the second layer of material are configured to cause acoustic signals emitted by the transmitter element to propagate through the one or more microlens structures and thereby constructively form, at a location different from a location of the acoustic transmitter element, one or more acoustic signals having a higher pressure than the acoustic signals emitted by the transmitter element.

* * * * *